United States Patent
Ebert et al.

(10) Patent No.: US 11,434,813 B2
(45) Date of Patent: Sep. 6, 2022

(54) VALVE ASSEMBLY FOR A MULTI-SCROLL TURBINE

(71) Applicant: BorgWarner Inc., Auburn Hills, MI (US)

(72) Inventors: Stefan Ebert, Kindenheim (DE); Ondrej Cempirek, Kirchheimbolanden (DE); Ivan Injac, Albisheim (DE); Patrick Witteck, Eisenberg (DE); Jason Robert Walkingshaw, Heidelberg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/981,746

(22) PCT Filed: Feb. 22, 2019

(86) PCT No.: PCT/US2019/019082
§ 371 (c)(1),
(2) Date: Sep. 17, 2020

(87) PCT Pub. No.: WO2019/190662
PCT Pub. Date: Oct. 3, 2019

(65) Prior Publication Data
US 2021/0033022 A1    Feb. 4, 2021

(30) Foreign Application Priority Data
Mar. 27, 2018  (DE) .................... 202018101705.5

(51) Int. Cl.
*F02B 37/18*    (2006.01)
*F02B 37/02*    (2006.01)
(Continued)

(52) U.S. Cl.
CPC .......... *F02B 37/186* (2013.01); *F01D 17/146* (2013.01); *F02B 37/025* (2013.01);
(Continued)

(58) Field of Classification Search
CPC ...... F02B 37/186; F02B 37/22; F02B 37/183; F02B 37/025; F02B 37/18; F16K 1/2014;
(Continued)

(56) References Cited

U.S. PATENT DOCUMENTS

2009/0028694 A1  1/2009  Naemura et al.
2012/0292547 A1  11/2012 Kierat et al.
(Continued)

FOREIGN PATENT DOCUMENTS

DE    102013002894 A1 * 9/2014  ............ F02B 37/183
DE    10 2015 011256 A1    3/2016
(Continued)

OTHER PUBLICATIONS

International Search Report of the International Searching Authority for PCT/US2019/019082 dated Apr. 23, 2019.

*Primary Examiner* — Audrey B. Walter
*Assistant Examiner* — Edward Bushard
(74) *Attorney, Agent, or Firm* — Howard & Howard Attorneys PLLC

(57) ABSTRACT

The invention relates to a valve assembly (100) for a multi-scroll turbine (10) for controlling an overflow of exhaust gases between a first spiral (36) and a second spiral (38) and for controlling a bypass opening (50). The valve assembly 100 comprises a lever (110) and a valve closing element (120) which is operatively connected to the lever (110). Furthermore, the valve assembly (100) comprises a spring element (130) which is designed to pre-bias the valve closing element (120) the against lever (110).

16 Claims, 17 Drawing Sheets

(51) Int. Cl.
  *F16K 1/20* (2006.01)
  *F01D 17/14* (2006.01)
  *F02B 37/22* (2006.01)
  *F02C 9/18* (2006.01)

(52) U.S. Cl.
  CPC ............ *F02B 37/18* (2013.01); *F02B 37/183* (2013.01); *F02B 37/22* (2013.01); *F02C 9/18* (2013.01); *F16K 1/205* (2013.01); *F16K 1/2014* (2013.01); *F16K 1/2064* (2013.01); *F05D 2220/40* (2013.01); *Y02T 10/12* (2013.01)

(58) Field of Classification Search
  CPC ...... F16K 1/205; F16K 1/2064; F16K 1/2021; F02C 9/18; F01D 17/146; F01D 17/105; F01D 25/24; Y02T 10/12; F05D 2220/40
  See application file for complete search history.

(56) References Cited

U.S. PATENT DOCUMENTS

| | | | |
|---|---|---|---|
| 2014/0072412 | A1 | 3/2014 | Marques et al. |
| 2014/0345273 | A1* | 11/2014 | Yamaguchi ............... F02C 6/12 60/602 |
| 2015/0147162 | A1* | 5/2015 | Stilgenbauer ........ F02B 37/183 415/145 |
| 2017/0261109 | A1 | 9/2017 | Yanagida et al. |
| 2018/0073425 | A1 | 3/2018 | Stilgenbauer et al. |

FOREIGN PATENT DOCUMENTS

| | | | | |
|---|---|---|---|---|
| DE | 102015011256 | A1 * | 3/2016 | ............ F02B 37/183 |
| EP | 1 988 265 | A1 | 11/2008 | |
| EP | 2 708 717 | A1 | 3/2014 | |
| EP | 2 917 531 | A1 | 9/2015 | |
| EP | 2 917 531 | B1 | 5/2018 | |
| JP | S61 33923 | U | 3/1986 | |

\* cited by examiner (A - A)

"A"

(A - A)

VALVE ASSEMBLY FOR A MULTI-SCROLL TURBINE

CROSS-REFERENCE TO RELATED APPLICATIONS

The present application is the National Stage of International Patent Application No. PCT/US2019/019082 filed on Feb. 22, 2019, which claims the benefit of German Patent Application No. 202018101705.5 filed Mar. 27, 2018, which are hereby incorporated by reference in their entirety.

TECHNICAL FIELD

The present invention relates to a valve assembly for a multi-scroll turbine. In particular, the present invention relates to a multi-scroll turbine with a corresponding valve assembly.

BACKGROUND

Increasingly more vehicles of the more recent generation are equipped with charging devices in order to achieve target demands and legal requirements. In the development of charging devices, it is imperative to optimize both the individual components as well as the system as a whole with respect to their reliability and efficiency.

Known exhaust gas turbochargers have a turbine with a turbine wheel which is driven by the exhaust gas flow of the internal combustion engine. A compressor with a compressor wheel, which is arranged with a turbine wheel on a mutual shaft, compresses the fresh air taken in for the engine. By this means, the amount of air or oxygen, available to the engine for combustion, is increased. This in turn leads to a performance improvement of the internal combustion engine. Multiple volute turbines are also known in the prior art in particular, which are used, for example, for six cylinder engines.

The disadvantage in the known, multi-scroll turbines, for example, dual volute turbines or twin scroll turbines, is that at certain operating state, for example, starting at a certain speed, the separation in the two spirals negatively impacts the performance of the turbocharger. To remedy this problem, it is known from the prior art to provide overflow areas, in which the exhaust gases may overflow from one spiral into the other spiral and in the reverse direction. It is additionally known to open and close these overflow areas variably via linear control devices comprising a corresponding valve assembly. Furthermore, it is known to combine these overflow areas with a bypass opening. By this means, the possibility arises for controlling the bypass opening and the overflow areas using the same valve assembly. The disadvantages in the known systems are increased wear in the action areas of the valve assembly and thus a constrained bypass or overflow function of the multi-scroll turbine.

The object of the present invention is to provide a valve assembly for a multi-scroll turbine and a corresponding multi-scroll turbine with an optimized valve assembly for improved bypass or overflow function.

BRIEF SUMMARY OF THE INVENTION

The present invention relates to a valve assembly for a multi-scroll turbine according to Claims 1 and 5, and to a multi-scroll turbine comprising a corresponding valve assembly according to Claim 15.

In one first embodiment, the valve assembly according to the invention for a multi-scroll turbine for controlling an overflow of exhaust gases between a first spiral and a second spiral and also for controlling a bypass opening comprises a lever and a valve closing element which is operatively connected to the lever. Furthermore, the valve assembly comprises a spring element which is designed to pre-bias the valve closing element against the lever. By this means, the relative movements between the lever and the valve closing element may be compensated or damped. This is particularly advantageous in a multi-scroll turbine in the installed state, as then on the one hand, vibrations of the valve closing element may be damped. Thus, wear on the valve closing element and on the areas contacting the valve closing element, like a valve seat, may be reduced. On the other hand, noise from the moving valve assembly, in particular from the valve closing element, may be reduced. Due to the spring element between the lever and the valve closing element, a force may be damped, which is exerted on the valve closing element by the gas flow guided through the spirals. Thus, a corresponding vibratory movement of the valve closing element is also limited, which then finally leads to lower wear both on the valve closing element itself and also on the turbine housing and also to less noise. Thus, the reliability and the lifecycle of the system may ultimately be increased.

In embodiments which are combinable with the preceding embodiment, the valve closing element may comprise a cylindrical projection.

In embodiments which are combinable with the preceding embodiment, the valve closing element may be designed as at least partially hollow. The cylindrical projection may thereby extend centrally from the bottom of the hollow valve closing element into a cavity of the valve closing element.

In embodiments which are combinable with the preceding embodiment, the lever may have a valve section which is designed to project into the cavity of the valve closing element.

In embodiments which are combinable with the preceding embodiment, the valve section may have a substantially fork-shaped end region. Alternatively, the valve section may have a substantially eyelet-shaped end region. The end region may thereby surround, in particular radially surround, the cylindrical projection of the valve closing element, so that the lever is operatively connected to the valve closing element.

In embodiments, which are combinable with any one of the preceding embodiments, the valve closing element may have a sliding contact surface, on which a first sliding contact surface of the lever may slide. In addition, the sliding contact surface may be arranged on an inner contour of the valve closing element.

In embodiments which are combinable with the preceding embodiment, the sliding contact surface may be designed as curved, in particular curved and annular. Furthermore, the first sliding contact surface of the lever may be designed as curved or conical, so that the lever may slide via the first sliding contact surface on the sliding contact surface of the valve closing element.

The sliding contact surface of the valve closing element may thereby be arranged in particular radially outside of the cylindrical projection. Alternatively or additionally, the sliding contact surface of the valve closing element may thereby be arranged on the bottom of the cavity. Alternatively, the sliding contact surface of the valve closing element may also be designed as conical or flat.

In a second embodiment, the valve assembly according to the invention for a multi-scroll turbine for controlling an overflow of exhaust gases between a first spiral and a second spiral, and for controlling a bypass opening, comprises a lever and a valve closing element which is operatively connected to the lever. The valve closing element is thereby designed as at least partially hollow and comprises a cylindrical projection, which extends centrally from the bottom of the hollow valve closing element into a cavity of the valve closing element. The lever has a valve section with a substantially hollow cylindrical end region. The hollow cylindrical end region is arranged in the cavity and surrounds the cylindrical projection so that the lever is operatively connected to the valve closing element. By this means, relative movements between the lever and the valve closing element may be compensated or limited. This is particularly advantageous in the installed state in a multi-scroll turbine, as then on the one hand, vibrations of the valve closing element may be limited. Thus, wear on the valve closing element and on the areas contacting the valve closing element, like a valve seat, may be reduced. On the other hand, noise from the moving valve assembly, in particular from the valve closing element, may be reduced. Thus, a corresponding vibratory movement of the valve closing element is also limited, which then finally leads to lower wear both on the valve closing element itself and also on the turbine housing and also to less noise. Thus, the reliability and the lifecycle of the system may ultimately be increased.

In embodiments of the second embodiment, which are combinable with the preceding embodiment, the valve assembly may additionally comprise a spring element, which is designed to pre-bias the valve closing element against the lever. Due to the spring element, a force may be damped, which is exerted on the valve closing element by the gas flow guided in a pulsing way through the spirals. Thus, a corresponding vibratory movement of the valve closing element is also limited, which then finally leads to lower wear both on the valve closing element itself and also on the turbine housing and also to less noise. Thus, the reliability and the lifecycle of the system may ultimately be increased.

In embodiments of the second embodiment, which are combinable with any one of the preceding embodiments, the valve section may be designed to project into the cavity.

In embodiments of the second embodiment, which are combinable with any one of the preceding embodiments, the valve closing element may have a sliding contact surface, on which a first sliding contact surface of the lever may slide.

In embodiments of the second embodiment, which are combinable with the preceding embodiment, the sliding contact surface may be arranged on an inner contour of the valve closing element.

In embodiments of the second embodiment, which are combinable with any one of the two preceding embodiment, the sliding contact surface may be designed as curved or conical. The sliding contact surface may also thereby be designed in particular as annular. Furthermore, the first sliding contact surface of the lever may be designed as curved, so that the lever may slide via the first sliding contact surface on the sliding contact surface of the valve closing element. The bottom may be designed as flat between the sliding contact surface of the valve closing element and the cylindrical projection.

In embodiments of the second embodiment, which are combinable with any one of the preceding embodiments, the lever may comprise a first annular projection and a second annular projection. The first annular projection thereby extends radially outward from the hollow cylindrical end region and is spaced axially apart from the second annular projection along a hollow cylindrical axis.

In embodiments of the second embodiment, which are combinable with the preceding embodiment, the second annular projection may extend radially outward from the hollow cylindrical end region. In addition, the radially outer lateral face of the second annular projection may be designed in such a way, in particular designed as curved, and may contact the inner contour in such a way that a limited tilting of the lever is enabled with respect to the valve closing element. Alternatively, the second annular projection may extend radially inward from the hollow cylindrical end region. In addition, a radially outer lateral face of the cylindrical projection may be designed in such a way, in particular may be designed as curved, and may contact with a radially inner lateral face of the second annular projection in such a way that a limited tilting of the lever is facilitated with respect to the valve closing element.

In embodiments of the second embodiment, which are combinable with any one of the two preceding embodiments, the second annular projection may be configured to engage with the inner contour of the valve closing element in such a way that the lever is centered with respect to the valve closing element.

In embodiments of the second embodiment, which are combinable with any one of the three preceding embodiments, the first sliding contact surface may be arranged on the first annular projection. The first annular projection may thereby be located in a first contact region between the valve closing element and the lever on the bottom of the cavity.

In embodiments of the second embodiment, which are combinable with any one of the preceding embodiments, an outer diameter of the cylindrical projection may be smaller than an inner diameter of the hollow cylindrical end region.

Embodiments are subsequently explained in greater detail, which are combinable with any one of the two embodiments:

In embodiments, in which the valve closing element comprises a cylindrical projection, which are combinable with any one of the preceding embodiments, the valve assembly may additionally comprise a disk which is arranged on the cylindrical projection of the valve closing element. The cylindrical projection may thereby extend along a center axis of the valve closing element. The cylindrical projection may thereby extend in a direction which is opposite the closing direction of the valve closing element. Alternatively or additionally, the disk may be arranged in the cavity of the valve closing element. In particular, the cylindrical projection may be arranged in the cavity. In other words, this means that the cylindrical projection may extend from the bottom of the cavity in the axis direction opposite the closing direction of the valve closing element. The cylindrical projection may thereby be arranged only within the cavity or also projecting beyond the same in the axis direction. The axis of the cylindrical projection may thereby conform to the center axis. The disk may thereby be arranged in an end region of the cylindrical projection, thus on a free end of the cylindrical projection. The disk may thereby be fixed on the cylindrical projection, in particular, the disk may thereby be welded to the cylindrical projection. Thus, a force transmission between the cylindrical projection and the disk is possible or improved.

In embodiments in which the valve assembly comprises a spring element and which are combinable with the preceding embodiment, the spring element may be arranged between the disk and the lever. Between the disk and the lever may mean, in this case, in particular axially between the disk and lever. The lever may thereby be arranged in the region of the cylindrical projection. The lever may thereby be arranged, in particular, radially outside of the cylindrical projection. Due to this advantageous embodiment, a force transfer between the lever and the disk, and thus between the lever and the valve closing element, is possible on the on hand. On the other hand, a damping of the forces acting between the disk or the valve closing element and the lever is possible due to the spring element arranged between the lever and the disk. Alternatively, the spring element may be arranged between the valve closing element and the lever. The embodiments just described apply analogously for this second case.

In embodiments, which are combinable with any one of the preceding embodiments, a first contact region, which is designed for mutual sliding, may be formed between the valve closing element and the lever. Alternatively or additionally, in embodiments in which a spring element is provided, a second contact region, which is designed for mutual sliding, may be formed between the spring element and the lever. Due to these advantageous embodiments, an oblique position of the valve closing element relative to the surfaces to be sealed may be reduced, by which means the function, in particular the sealing function of the valve assembly, is improved.

In embodiments with a first sliding contact surface of the lever and a sliding contact surface of the valve closing element, which are combinable with the preceding embodiment, the first sliding contact surface of the lever and the sliding contact surface of the valve closing element may contact one another via a linear contact. Linear contact is hereby to be understood as a linear contact in the circumferential direction. By this means, friction is minimized and a certain movement is ensured between the valve closing element and the lever. In particular, a certain tilting movement of the valve closing element relative to the lever is desired, by which means, in certain open states of the valve assembly, an oblique position of the valve closing element relative to the surfaces to be sealed or to be closed may be reduced.

In embodiments, which are combinable with any one of the preceding embodiments, the lever may have a second sliding contact surface on which a first sliding contact surface of the spring element may slide. The second sliding contact surface of the lever may thereby be designed, in particular, as curved or conical. Alternatively, the second sliding contact surface of the lever may also be designed as flat.

In embodiments which are combinable with the preceding embodiment, the second sliding contact surface of the lever and the first sliding contact surface of the spring element may contact each other via a linear contact.

In embodiments with a spring element and a disk, which are combinable with any one of the preceding embodiments, the spring element may have a second sliding contact surface so that the spring element may slide on the disk.

In embodiments, which are combinable with any one of the preceding embodiments, the spring element may be designed as a disk spring. In alternative embodiments, the spring element may also have a different spring shape, for example, an annular wave spring, a helical spring, or the like.

In embodiments, which are combinable with any one of the preceding embodiments, the spring element may be designed as a substantially annular base body with at least three radially projecting spring arms. The spring arms may thereby project radially from an outer periphery of the annular base body. The spring arms may thereby, in particular, be not connected to one another in the radially outer regions. The spring arms may thereby be curved in the radial direction in order to exert a pre-biasing force on the lever. At least two of the at least three spring arms may thereby be configured differently. In embodiments in which the second sliding contact surface of the lever is designed as curved, the spring arms may be designed as correspondingly curved, so that a sliding between the spring arms and lever, in particular, exclusively between the spring arms and lever, is facilitated. The expression 'exclusively' relates herein only to a sliding between the spring element and the lever, however, not to other contact regions, for example, sliding between the lever and the valve closing element.

In embodiments, which are combinable with any one of the preceding embodiments, the valve closing element may be designed as substantially hat-shaped. In other embodiments, the valve closing element may also have other suitable rotationally-symmetrical shapes, for example, a bowl shape or a cylindrical shape. Alternatively, the valve closing element may also be designed as oval. The valve closing element may thereby, in particular, be designed as an ellipse.

In embodiments with a valve section and in which the valve closing element is designed as at least partially hollow, which are combinable with any one of the preceding embodiments, the valve section may, in particular, be designed as step-shaped in order to project into the cavity. Alternatively or additionally, the valve section and/or the spring element may be arranged in the cavity of the valve closing element.

In embodiments, which are combinable with any one of the preceding embodiments, the valve assembly may additionally comprise a spindle, which is connected to the lever for displacing the valve closing element. The lever and spindle may thereby be preferably formed integrally, and are particularly preferably welded to each other. The spindle may thereby function for a rotatable mounting of the valve assembly in a housing, in particular, in a turbine housing.

In embodiments, which are combinable with any one of the preceding embodiments, the valve closing element may be designed in such a way that, in the installed state, it may be brought into engagement with a valve region in a connection region between the first spiral and the second spiral.

In embodiments which are combinable with the preceding embodiment, the valve closing element may comprise an annular sealing surface. The sealing surface may thereby be designed in such a way that, in the installed state, it may be brought into contact with a valve seat of a turbine housing in order to seal a bypass opening in a connection region between the first spiral and the second spiral.

In embodiments, which are combinable with any one of the preceding embodiments, the valve closing element may have an inner contour and an outer contour. In addition, the outer contour may be configured as substantially bowl-shaped. Alternatively or additionally, the outer contour may be configured as substantially rotationally symmetrical. Alternatively, the outer contour may also be designed as oval. The outer contour may thereby, in particular, be designed as an ellipse.

In embodiments which are combinable with the preceding embodiment, the outer contour may comprise a first contour section and a second contour section.

In embodiments which are combinable with the preceding embodiment, the first contour section may be substantially defined by three surfaces. At least two of the three surfaces may correspond to radii with different curvatures.

In embodiments which are combinable with the preceding embodiment, the surfaces of the first contour section are configured in such a way that, in the installed state, the contour section may be brought into engagement with a complementary-shaped valve region in a connection region between the first spiral and the second spiral.

In embodiments which are combinable with the preceding embodiment, the surfaces of the first contour section may be configured in such a way that, during a displacement of the valve closing element from a closed position into an open position, the first contour section initially continuously opens only the connection region for the overflow of exhaust gases between the first spiral and the second spiral, and, starting at a specific degree of opening of the valve closing element, additionally effects a continuous opening of the bypass opening.

In embodiments in which the valve closing element has an inner contour and an outer contour, which are combinable with any one of the preceding embodiments, the outer contour may have recesses in order to increase a bypass flow.

In embodiments which are combinable with the preceding embodiment, if the valve closing element has an inner contour and an outer contour, if the outer contour comprises first contour section and a second contour section, then the recesses may be arranged in the first contour section.

In embodiments which are combinable with the preceding embodiment, the recesses may be arranged on side walls of the first contour section and opposite by 180°.

In embodiments which are combinable with any one of the two preceding embodiments, the recesses may be configured in such a way that, during a displacement of the valve closing element from a closed position into an open position, the first contour section virtually simultaneously continuously opens the bypass opening and the connection region (for the overflow of exhaust gases between the first spiral and the second spiral).

In embodiments which are combinable with any one of the three preceding embodiments, the recesses may be configured in such a way that, they form a web-like elevation in the first contour section in the outer contour which may be brought into engagement with a complementary-shaped valve region in a connection region between the first spiral and the second spiral.

In embodiments which are combinable with the preceding embodiment, if the valve closing element has an inner contour and an outer contour, and if the outer contour comprises a first contour section and a section contour section, then the second contour section may form an annular sealing surface which is designed in such a way that, in the installed state, it may be brought into contact with a valve seat of a turbine housing in order to seal a bypass opening in a connection region between the first spiral and the second spiral.

In embodiments, which are combinable with any one of the preceding embodiments, the valve closing element may be designed in such a way that, in the installed state, it may be brought into engagement with a valve region in a connection region between the first spiral and the second spiral.

In embodiments, which are combinable with any one of the preceding embodiments, a seal may be designed between the valve closing element and the connection region. The seal may thereby comprise a sealing element. In addition, the sealing element may be arranged on the valve closing element or on the valve region. Alternatively to the sealing element, the seal may comprise a labyrinth-like seal, wherein the valve region and the valve closing element thereby engage in the closing direction into one another in such a way that an overlapping of the valve region and the valve closing element is present, at least in the closed state of the valve closing element, in the direction from the first spiral to the second spiral. In addition, the labyrinth-like seal may comprise an elevation following the course of the valve region and a depression following the course of the valve region, which engage into one another at least in the closed state of the valve closing element. The elevation may thereby be designed on one of the valve region or the valve closing element, wherein the depression may be designed on the other of the valve region or the valve closing element.

The invention additionally comprises a multi-scroll turbine for an exhaust gas turbocharger. The multi-scroll turbine comprises a turbine wheel, a turbine housing with a first spiral and a second spiral, a connection region, in which the first spiral and the second spiral are fluidically connected to each other, and a bypass opening, which is arranged in the connection region. In addition, the multi-scroll turbine comprises a valve assembly according to any one of the previous embodiments. The valve assembly is thereby arranged at least partially in the connection region so that the valve closing element may interact with the connection region and the bypass opening.

In embodiments which are combinable with the preceding embodiment, the valve assembly may be displaceable between a first position and a second position. The first position may thereby correspond to a completely closed position of the valve closing element and the second position may correspond to a completely open position of the valve closing element. In addition, the valve closing element may be designed to seal both the bypass opening and also the connection region in the completely closed position. 'Sealing' is not understood as a hermetic seal with respect to the connection region. Instead, the valve closing element penetrates into the connection region in such a way that an overflow between the spirals is substantially suppressed. This means that a majority of the gas volume flow flowing through a respective spiral, preferably more than 95% and particularly preferably more than 99% of the gas volume flow flowing through a respective spiral is prevented from an overflow by the valve closing element.

In embodiments, which are combinable with any one of the preceding embodiments, a valve region may be designed in the connection region for accommodating the valve closing element. The valve closing element in the completely closed position may interact with the valve region in such a way that an overflow of exhaust gases between the first spiral and the second spiral is suppressed. As already mentioned, this does not mean that the valve closing element hermetically seals the valve region at this point.

In embodiments, which are combinable with any one of the preceding embodiments, the turbine housing may have a valve seat in the connection region, wherein, in the closed position of the valve closing element, the annular sealing surface interacts with the valve seat in order to seal the bypass opening.

In embodiments, which are combinable with any one of the preceding embodiments, the valve assembly may be brought into multiple intermediate positions between the first position and the second position. By this means, the valve assembly may be flexibly adapted to the most varied of operating states and demands.

In embodiments, which are combinable with any one of the preceding embodiments, the valve assembly and, in particular, the valve closing element may be designed in such a way that a displacement of the valve assembly from the first position into the second position initially only continuously opens the connection region for the overflow of exhaust gases between the first spiral and the second spiral, and, starting at a certain degree of opening of the valve closing element, additionally effects a continuous opening of the bypass opening. By this means, the overflow between the spirals may be controlled, decoupled from the bypass opening up to a certain degree (degree of opening). This leads to a more flexible valve assembly which is adjustable in a more targeted way to certain operating ranges.

BRIEF DESCRIPTION OF THE DRAWINGS

FIG. 2a shows a sectional view of the valve assembly according to the invention from FIG. 1;

FIG. 2b shows an enlarged partial section of the sectional view from FIG. 2a;

FIG. 8a shows a sectional top view of a turbine according to the invention in a schematic depiction with a turbine wheel and visible, radial distances;

FIG. 8b shows a detailed section of the turbine along line A-A from FIG. 8a;

DETAILED DESCRIPTION

In the following, embodiments for valve assembly 100, 200 according to the invention for turbine 10 according to the invention are described by way of the figures.

Figure 1A:
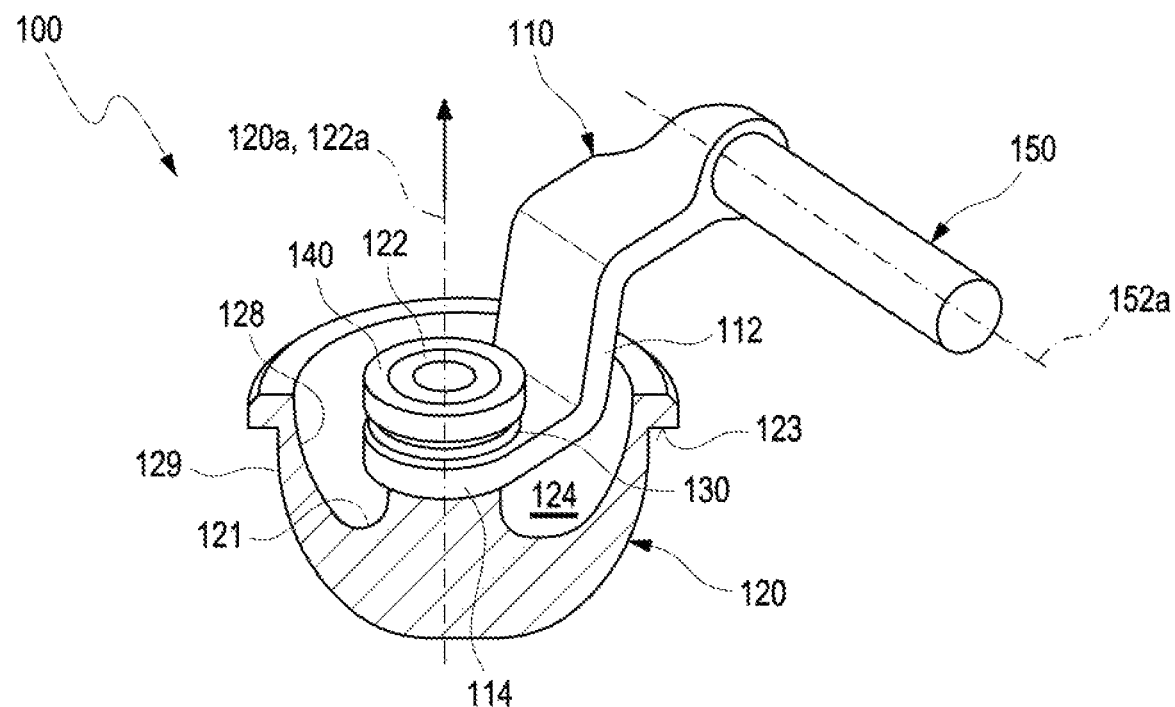
FIG. 1a shows an isometric view of a first embodiment of the valve assembly according to the invention with a valve closing element depicted in a sectional view.
Figure 2:
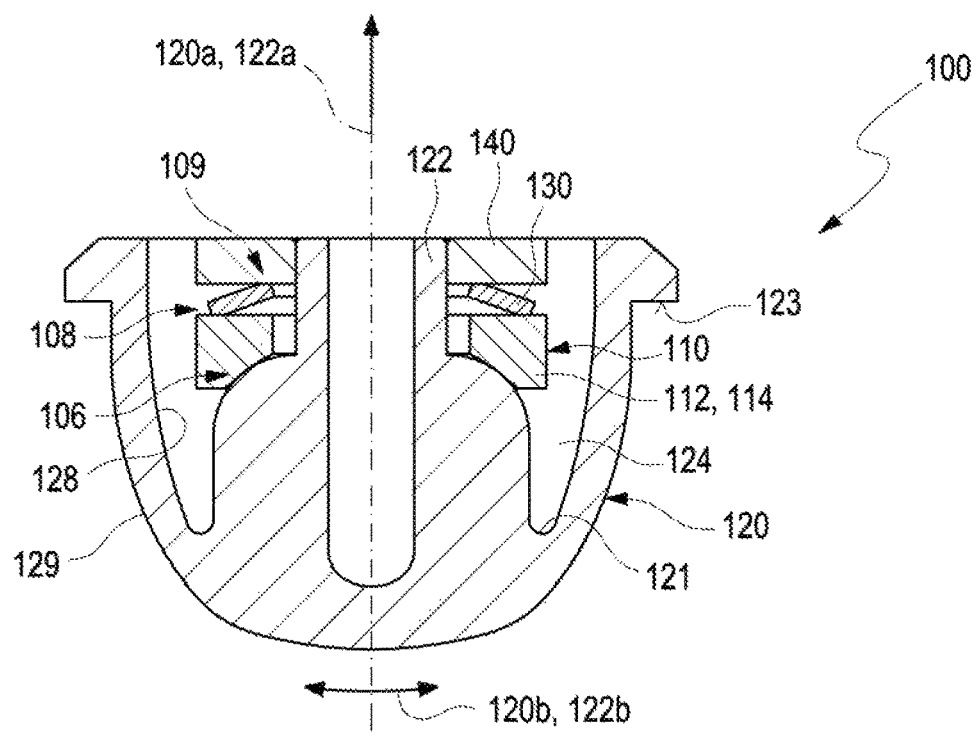
Figure 2:
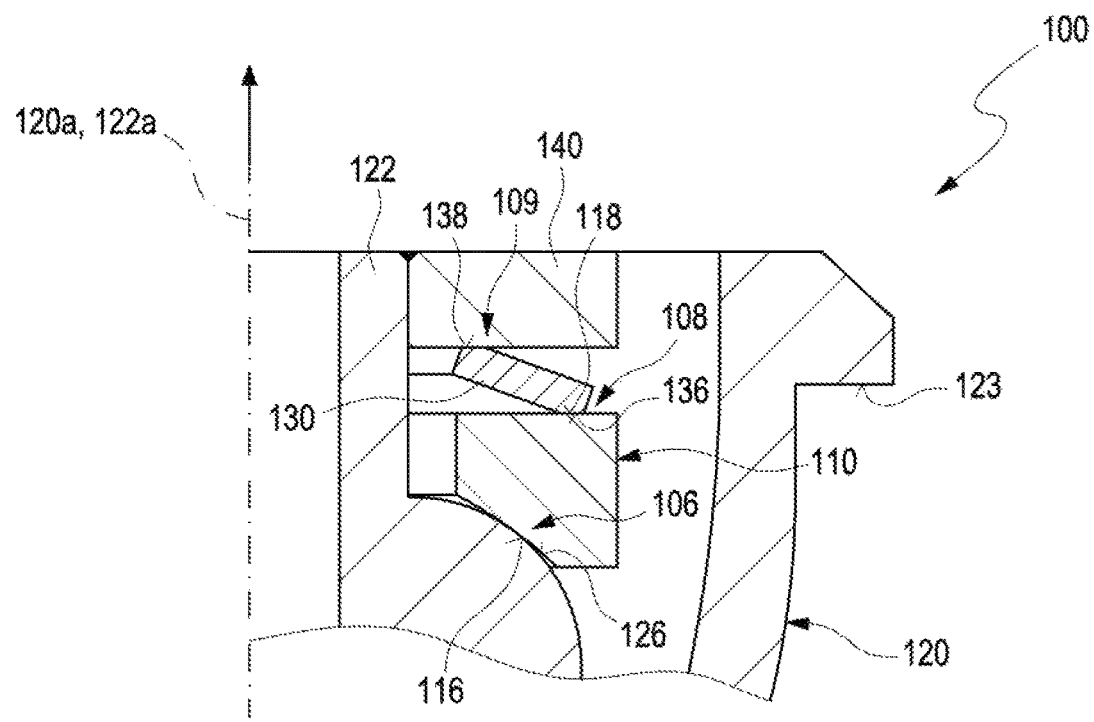

FIGS. 1a and 2a show a first embodiment of a valve assembly 100 according to the invention for a multi-scroll turbine 10 for controlling an overflow of exhaust gases between a first spiral 36 and a second spiral 38 and for controlling a bypass opening 50. Valve assembly 100 comprises a lever 110 and a valve closing element 120 which is operatively connected to lever 110. Furthermore, valve assembly 100 comprises a spring element 130 which is designed to pre-bias valve closing element 120 against lever 110. By this means, relative movements between lever 110 and valve closing element 120 may be compensated or damped. This is particularly advantageous in the installed state in a multi-scroll turbine 10, as then on the one hand vibrations of the valve closing element 120 may be damped. Thus, wear on valve closing element 120 and the regions contacting valve closing element 120, like a valve seat 33, may be reduced. On the other hand, noise from moving valve assembly 100, in particular from valve closing element 120, may be reduced. Due to spring element 130 between lever 110 and valve closing element 120, a force, which is exerted on valve closing element 120 by the gas flow guided through spirals 36, 38, may be damped. Thus, a corresponding vibratory movement of valve closing element 120 is also limited, which then finally leads to lower wear both on valve closing element 120 itself and also on turbine housing 30 and also to less noise. Thus, the reliability and the lifecycle of the system may ultimately be increased. Valve closing element 120 generally has an inner contour 128 and an outer contour 129.

In the exemplary embodiment of FIGS. 1a and 2a, valve assembly 100 according to the invention additionally has a disk 140. Valve closing element 120 additionally comprises a cylindrical projection 122 which extends along a center axis 120a of valve closing element 120. Cylindrical projection 122 thereby extends in a direction which is opposite the closing direction of valve closing element 120. It is additionally clear that disk 140 is arranged on cylindrical projection 122. Axis 122a of cylindrical projection 122 thereby conforms to center axis 120a of valve closing element 120. In alternative embodiments, an axis 122a of cylindrical projection 120 may, however, not conform to center axis 120a of valve closing element 120, which means that cylindrical projection 120 may also be arranged eccentrically on valve closing element 120. As is particularly clear from FIG. 2a, disk 140 is thereby arranged in an end region of cylindrical projection 122. End region of cylindrical projection 122 means here a free end of cylindrical projection 122 in the direction of the arrow, which runs at the end of the axis along the axis, which is described by reference numerals 120a, 122a. In alternative embodiments, the disk may also be arranged at another axial position of the cylindrical projection, for example, farther opposite arrow direction 120a, 122a. In the exemplary embodiment, disk 140 is fixed on cylindrical projection 122 such that a force transfer is possible between cylindrical projection 122 and disk 140. This may be implemented, for example, by a welded connection (see FIG. 2a). As is additionally clear in FIG. 2a, cylindrical projection 122 is designed as a hollow cylinder. In alternative embodiments, cylindrical projection 122 may, however also be designed as a full cylinder, or inverted cone, or cylinder-like.

Spring element 130 is thereby arranged axially between disk 140 and lever 110, wherein lever 110 is thereby arranged in the region of cylindrical projection 122, thus is arranged in radial direction 122b outside of cylindrical projection 122 (see, in particular, FIG. 2a). That means, that lever 110 radially surrounds cylindrical projection 122 at least partially (see, in particular, FIG. 1a). Due to this advantageous embodiment, a force transfer between lever 110 and disk 140, and thus between lever 110 and valve closing element 120, is possible on the on hand. On the other hand, a damping of the forces acting between disk 140 or valve closing element 120 and lever 110 is possible due to spring element 130 arranged between lever 110 and disk 140. Alternatively, spring element 130 may be arranged between valve closing element 120 and lever 110. The embodiments described in conjunction with spring element 130 arranged axially between disk 140 and lever 110 apply analogously for embodiments in which spring element 130 is arranged between valve closing element 120 and lever 110.

In the embodiment shown, valve closing element 120 is designed at least partially as hollow. Cylindrical projection 122 is thereby arranged in cavity 124 or extends from bottom 121 of cavity 124 in axis direction 120a, 122a opposite the closing direction of valve closing element 120. Cylindrical projection 122 is thereby arranged only within cavity 124. That is, cylindrical projection 122 ends flush with the radially outer regions of valve closing element 120 (see FIG. 2a). In alternative embodiments, cylindrical projection 122 may also project past cavity 124 in axis direction 120a, 122a opposite the closing direction, or, however, end farther inside of cavity 124 in the closing direction.

In the exemplary embodiment, disk 140, lever 110, and spring element 130 are likewise arranged in cavity 124 on cylindrical projection 122 (see FIG. 2a). As is depicted in FIG. 1a, lever 110 has a valve section 112 which is designed to project into cavity 124 of valve closing element 120. Disk 140 thereby functions to secure against spring element 130 and lever 110 slipping out, and as a counter bearing of spring element 130 to guarantee a pre-biasing between valve closing element 120 and lever 110.

Figure 1B:
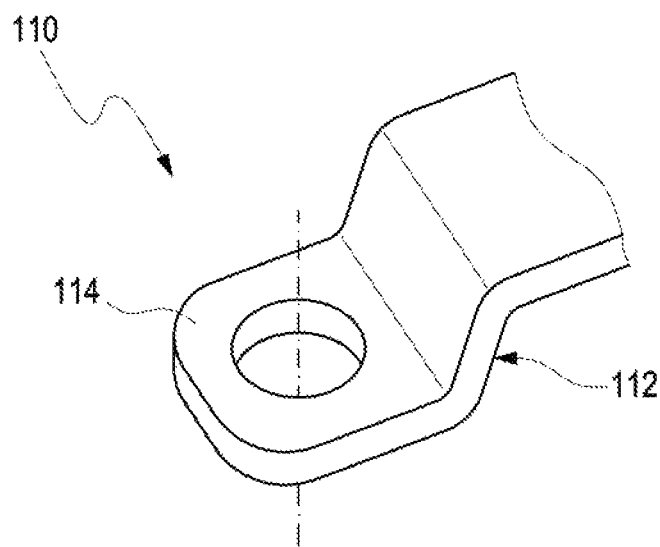
FIG. 1b shows an enlarged partial section of a lever of the valve assembly according to the invention from FIG. 1.

With regards to this, FIG. 1b shows an enlarged partial section of lever 110 with valve section 112. Valve section 112 is thereby designed as stepped-shaped in order to project into cavity 124. Valve section 112 of lever 110 has an end region 114, which is designed like an eyelet. Due to this advantageous embodiment, lever 110 may project into cavity 124 on the one hand, and on the other hand surround, in particular radially surround, cylindrical projection 122 so that lever 110 is operatively connected to valve closing element 120. In alternative embodiments, valve section 112 may also have a substantially fork-shaped end region 114.

FIGS. 3a to 4c show a second embodiment of a valve assembly 200 according to the invention for a multi-scroll turbine 10 for controlling an overflow of exhaust gases between a first spiral 36 and a second spiral 38 and for controlling a bypass opening 50. Valve assembly 200 is generally constructed similarly to valve assembly 100. Identical features are thereby indicated with analogous reference numerals. Like valve assembly 100, valve assembly 200 also comprises a lever 210 and a valve closing element 220 which is operatively connected to lever 210. Valve closing element 220 is thereby designed as at least partially hollow and comprises a cylindrical projection 222. Cylindrical projection 222 extends centrally from bottom 221 of hollow valve closing element 220 into a cavity 224 of valve closing element 220. Lever 210 has a valve section 212 with a substantially hollow cylindrical end region 214. Valve section 212 is thereby designed to project into cavity 224. Hollow cylindrical end region 214 is arranged in cavity 224 and surrounds cylindrical projection 222 so that lever 210 is operatively connected to valve closing element 220. By this means, relative movements between lever 210 and valve closing element 220 may be compensated or damped. This is particularly advantageous in the installed state in a multi-scroll turbine 10, as then on the one hand, vibrations of valve closing element 220 may be limited. Thus, wear on valve closing element 220 and on the areas contacting valve closing element 220, like a valve seat 33, may be reduced. On the other hand, noise from moving valve assembly 200, in particular from valve closing element 120, may be reduced. Thus, a corresponding vibratory movement of valve closing element 220 is also limited, which then finally leads to lower wear both on valve closing element 220 itself and also on turbine housing 30 and also to less noise. Thus, the reliability and the lifecycle of the system may ultimately be increased. Valve closing element 220 generally has an inner contour 228 and an outer contour 229.

As is depicted in FIGS. 4b and 4c, valve assembly 200 may additionally comprise a spring element 230 which is designed to pre-bias valve closing element 220 against lever 210. Due to spring element 230, a force may be damped, which is exerted on valve closing element 220 by the gas flow guided in a pulsing way through spirals 36, 38. Thus, a corresponding vibratory movement of valve closing element 220 is also limited, which then finally leads to lower wear both on valve closing element 220 itself and also on turbine housing 30 and also to less noise. Thus, the reliability and the lifecycle of the system may ultimately be increased.

Lever 210 comprises a first annular projection 214a and a second annular projection 214b (see, for example, FIG. 3a or FIG. 4a). First annular projection 214a thereby extends radially outward from hollow cylindrical end region 214 and is spaced axially apart from second annular projection 214b along a hollow cylindrical axis 222a. Second annular projection 214b extends radially outward from hollow cylindrical end region 214. A radially outer lateral face of second annular projection 214b is thereby designed as curved. The radially outer lateral face of second annular projection 214b may thus contact inner contour 228 in such a way that a limited tilting of the lever is enabled with respect to the valve closing element. In an alternative embodiment (see FIG. 3c), second annular projection 214b may extend radially inward from hollow cylindrical end region 214. A radially outer lateral section of cylindrical projection 222 is thereby designed as curved. Thus, a radially inner lateral face of second annular projection 214b may contact the radially outer lateral section of cylindrical projection 222 in such a way that a limited tilting of lever 210 is enabled with respect to valve closing element 220. Thus, second annular projection 214b may contact the inner contour of valve closing element 220 in such a way that lever 210 is centered with respect to valve closing element 220.

Valve closing element 220 has a sliding contact surface 226, on which a first sliding contact surface 216 of lever 210 may side (see FIG. 3b). Sliding contact surface 226 is thereby arranged on inner contour 228 on bottom 221 of valve closing element 220. Sliding contact surface 226 is thereby designed as curved and extends annularly. First sliding contact surface 216 is arranged on first annular projection 214a. First annular projection 214a is thereby located in a first contact region 206 between valve closing element 220 and lever 210 on bottom 221 of cavity 224. First sliding contact surface 216 of lever 210 is likewise designed as curved. The curvature of sliding contact surface 226 is, however, less than the curvature of first sliding contact surface 216 of lever 210, so that lever 210 may slide on sliding contact surface 226 of valve closing element 220 via first sliding contact surface 216. By this means, a linear contact is established, in particular, between first sliding contact surface 216 and sliding contact surface 226. Alternatively to the curved embodiment, sliding contact surface 226 may also be designed as conical (see FIGS. 10a and 10b). By this means, a linear contact is likewise established between first sliding contact surface 216 and sliding contact surface 226. As is clear, in particular in FIGS. 10a and 10b, bottom 221 may be designed as flat between sliding contact surface 226 of valve closing element 210 and cylindrical projection 222. That means that bottom 221 may extend along a plane orthogonal to center axis 220a, 222a. A flat bottom 221 may be used during manufacturing as a reference height, by which means additional dimensions of valve assembly 200 are in turn determined or manufactured in an easy way. This is applicable, both for the case of a curved and also for a conical sliding contact surface 226. Analogous to the second embodiment, bottom 121 of valve assembly 100 may be configured as flat corresponding to the first embodiment.

As is clear in FIGS. 3a to 3c, an outer diameter of cylindrical projection 222 is smaller than an inner diameter of hollow cylindrical end region 214.

Figure 3:
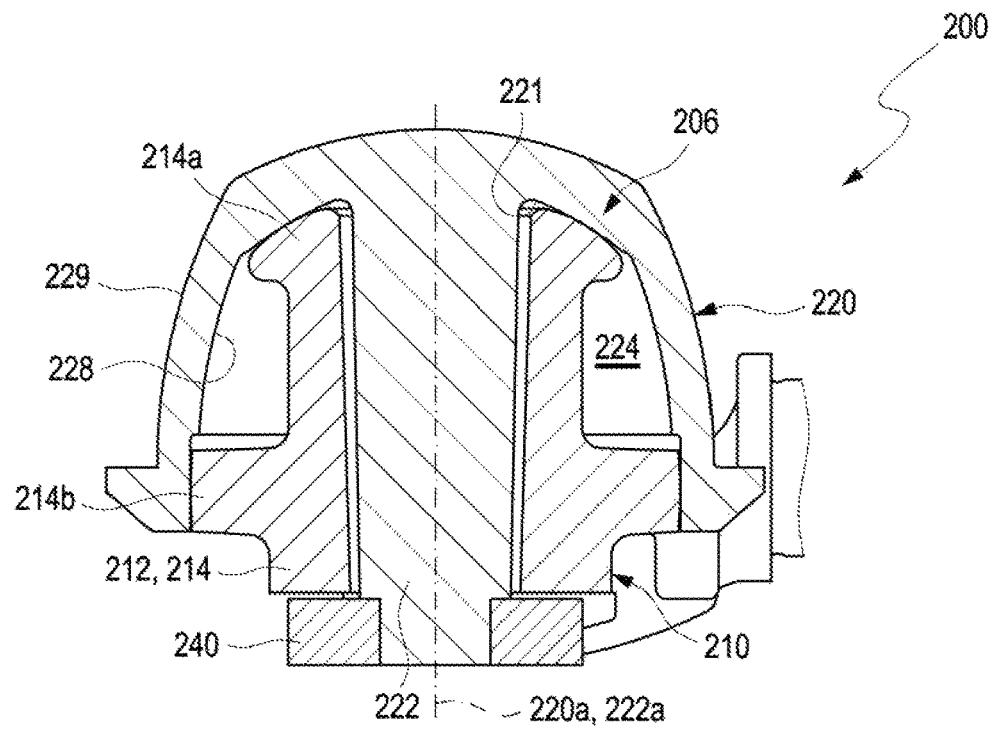
FIGS. 3a-3b show a sectional view of a second embodiment of the valve assembly according to the invention.
FIG. 3c shows a sectional view of the second embodiment of the valve assembly according to the invention in a specific configuration.
Figure 3:
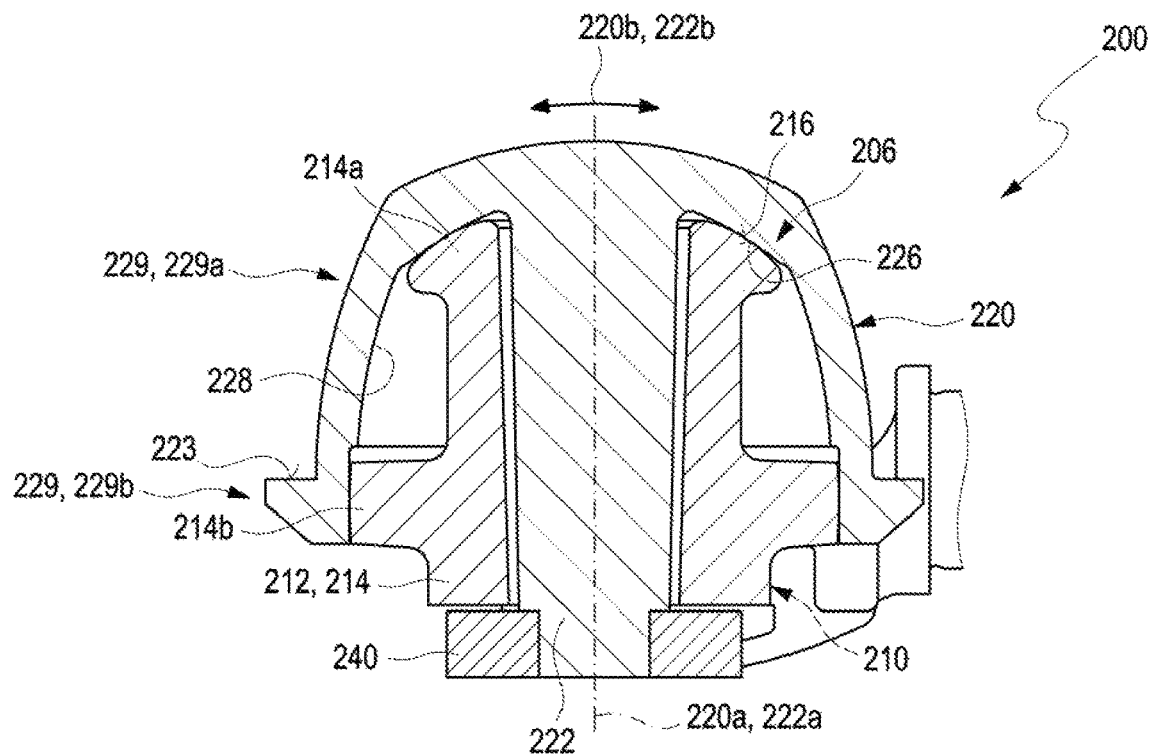
Figure 3:
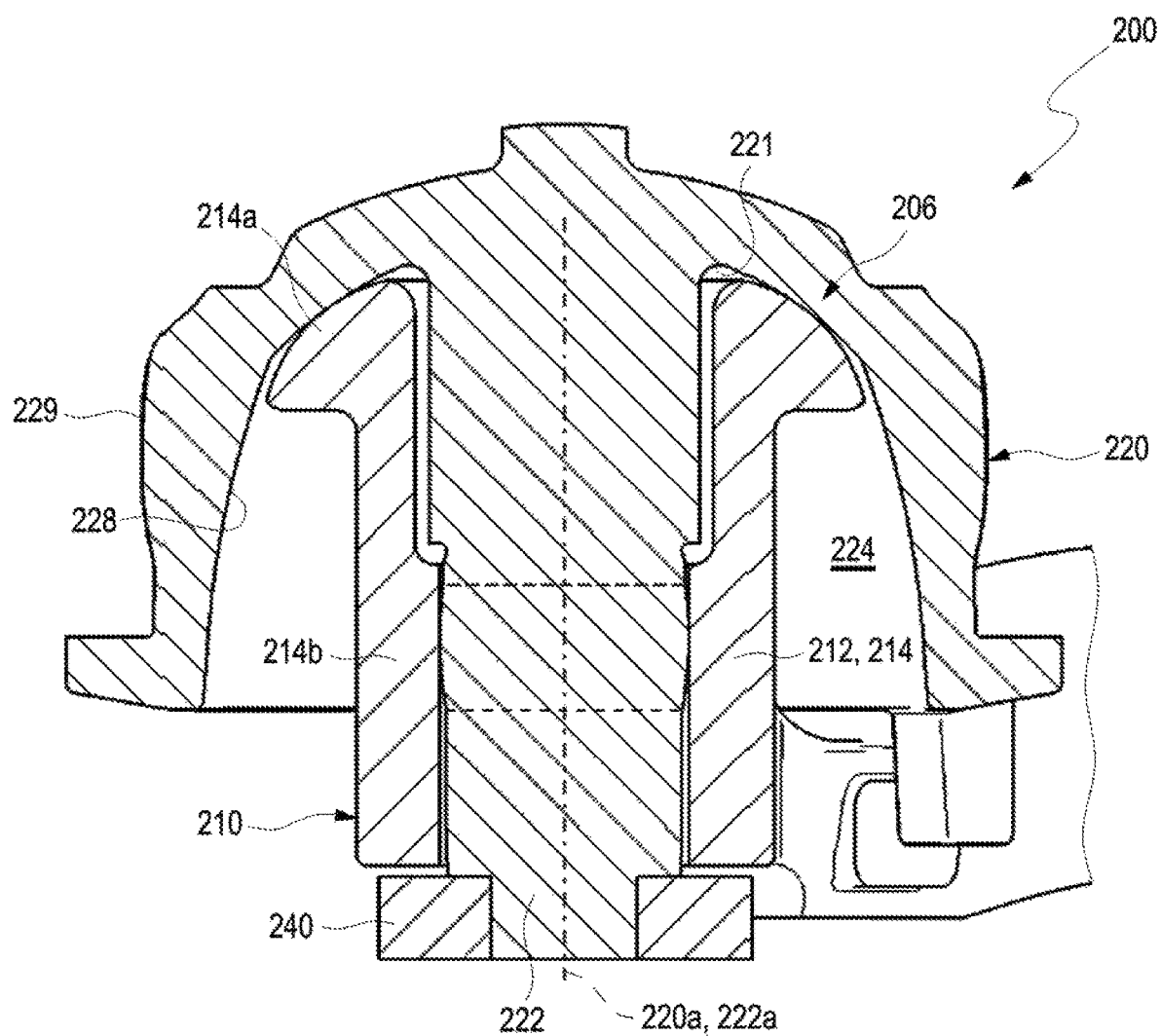
Figure 4:
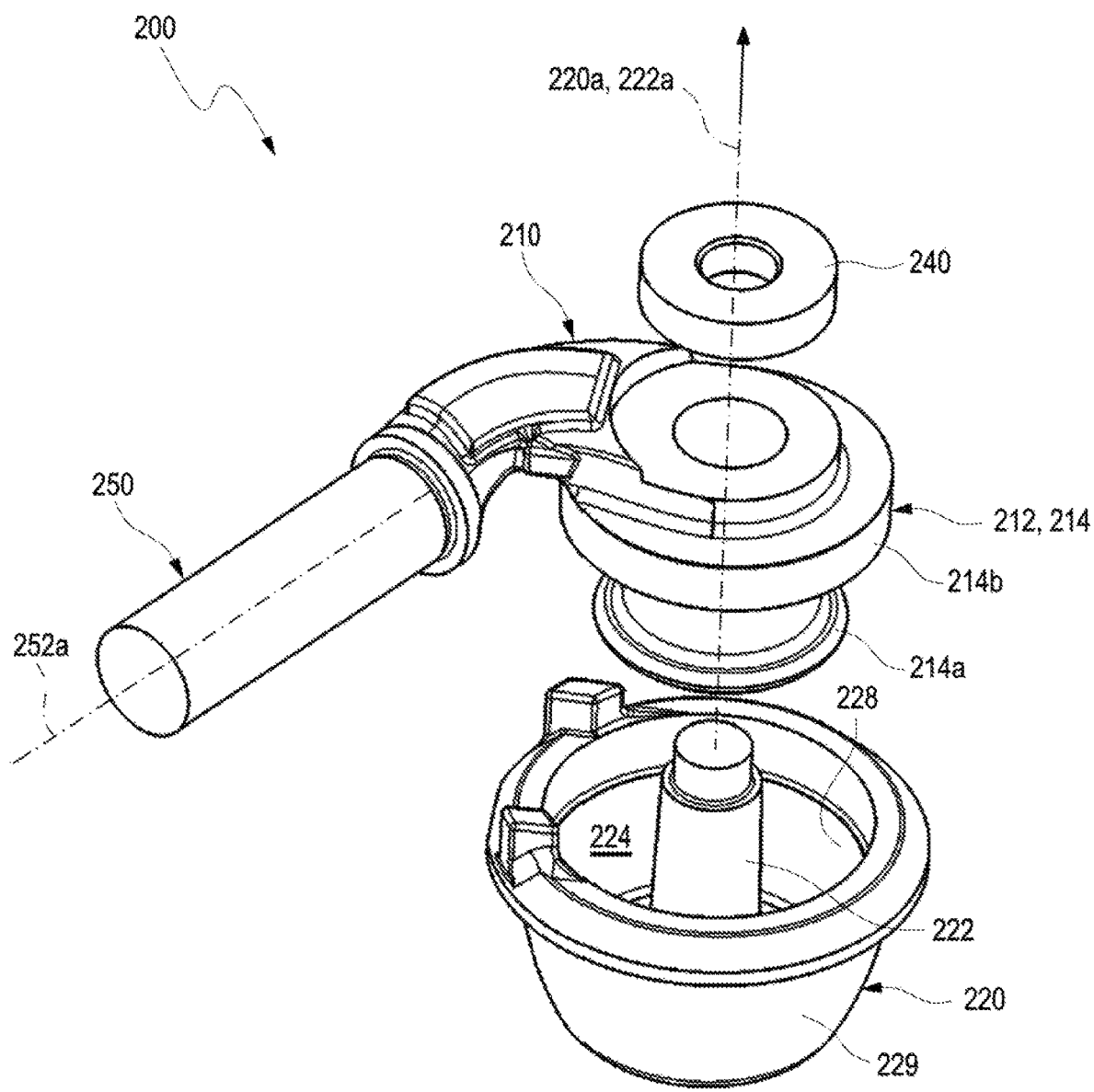
FIG. 4a shows an isometric exploded depiction of the second embodiment of the valve assembly according to the invention from FIGS. 3a-3b.
FIG. 4b shows an isometric exploded depiction of the second embodiment of the valve assembly according to the invention with an additional spring element.
FIG. 4c shows an isometric view of the second embodiment of the valve assembly according to the invention from FIG. 4a with an alternatively configured spring element.
Figure 4:
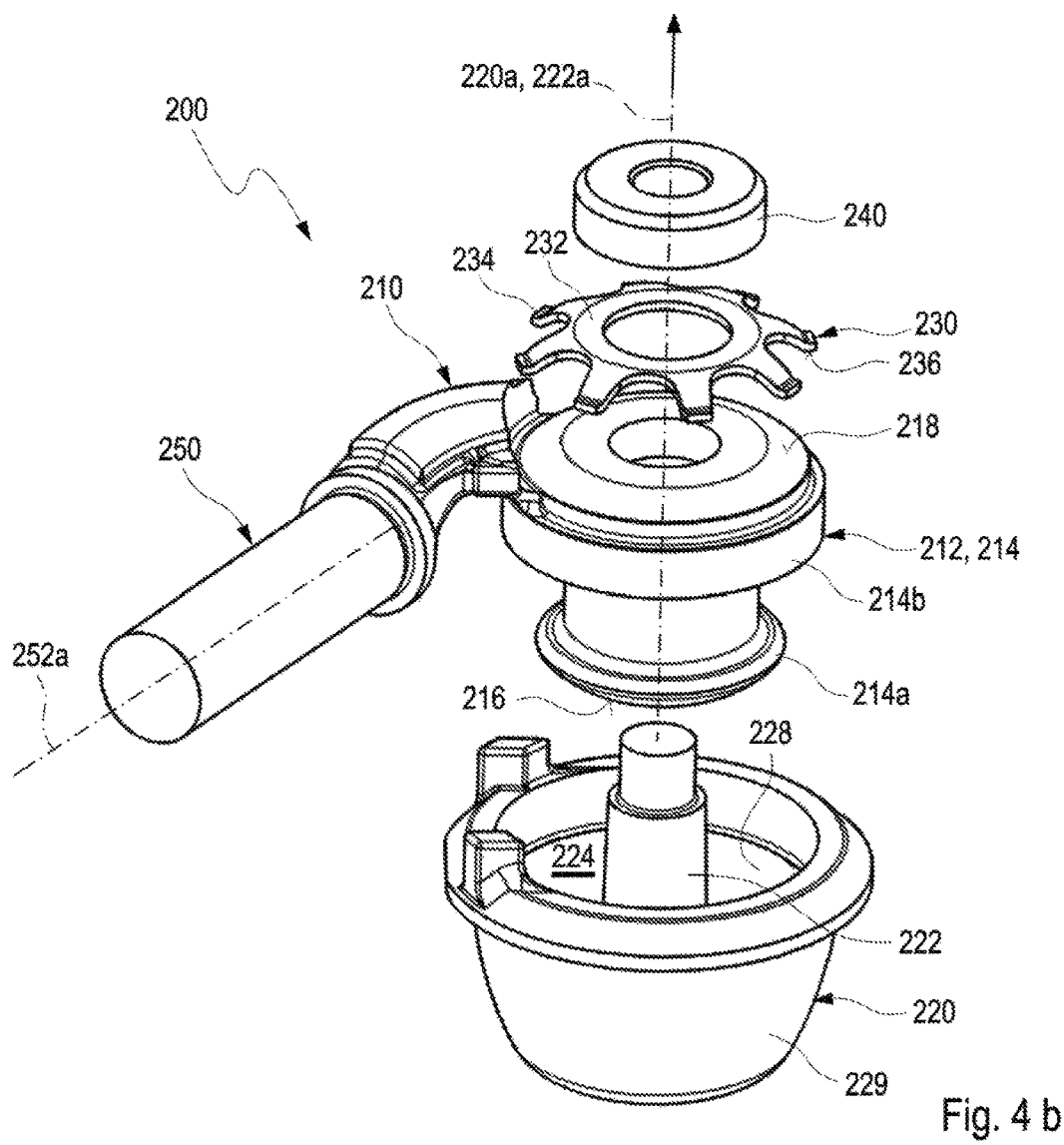
Figure 4:
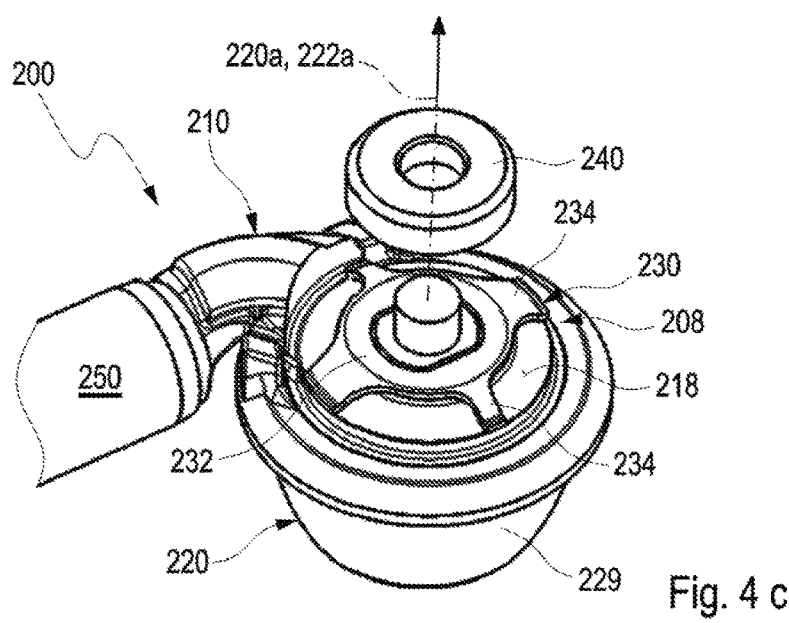

Like valve assembly 100, valve assembly 200 also comprises a disk 240, which is arranged on cylindrical projection 222 of valve closing element 220 (see FIG. 3). Disk 240 is thereby attached to a free end of cylindrical projection 222 or welded to the same. The free end thereby has a smaller diameter than the rest of cylindrical projection 222. By this means, disk 240 may be easily positioned on cylindrical projection 222 (see also FIG. 4a). In the exemplary embodiment of FIGS. 3 and 4, disk 240 is fixed on cylindrical projection 222 such that a force transfer is possible between cylindrical projection 222 and disk 240. This may be implemented, for example, by a welded connection. Disk 240 thereby functions to secure against spring element 230 and lever 210 slipping out, and as a counter bearing of spring element 230 to guarantee a pre-biasing between valve closing element 220 and lever 210.

The expression axial direction/axial relates in the context of this invention to a center axis 120a, 220a of valve closing element 120, 220, which is arranged substantially along the closing/opening directions. In the presence of a cylindrical projection 122, 222, the expression axial direction/axial 120a, 220a, 122a, 222a likewise relates to axis 122a, 222a of cylindrical projection 122, 222 or also to hollow cylinder axis 222a of hollow cylindrical end region 214 (when said end region 214 is arranged coaxially to cylindrical projection 122, 222). The expression radial or radial direction 120b, 220b, 122b, 222b accordingly relates to the radial directions/dimensions starting from the above-mentioned axial directions/dimensions 120a, 220a, 122a, 222a. The closing direction thereby designates a direction toward bypass opening 50 or toward a connection region 40 in which an overflow may occur between spirals 36, 38 (see, for example, FIG. 7, as is explained below in greater detail).

Additional features, which apply explicitly for both embodiments of valve assemblies 100 and 200 are mutually explained in the following. Even if some features relate to certain figures or are not clear or are not depicted in other figures, both embodiments of valve assemblies 100 and 200 may have these features.

Spring element 130, 230 is arranged axially between disk 140, 240 and lever 110, 210 (see, in particular, FIG. 2a and FIG. 4b). Lever 110, 210 or its end region 114, 214 is thereby arranged in the region of cylindrical projection 122, 222. This means that end region 114, 214 of lever 110, 210 is arranged in radial direction 122b, 222b outside of cylindrical projection 122, 222 (see, in particular, FIG. 2a and FIGS. 4b-4c). This means that lever 110, 210 radially surrounds cylindrical projection 122, 222 at least partially (see, in particular FIG. 1a). Due to this advantageous embodiment, a force transmission is possible between lever 110, 210 and disk 140, 240 on the one hand, and thus between lever 110, 120 and valve closing element 120, 220. On the other hand, a damping of the forces acting between disk 140, 240 or valve closing element 120, 220 and lever 110, 210 is possible due to spring element 130, 230 arranged between lever 110, 210 and disk 140, 240. In alternative embodiments, spring element 130, 230 may be arranged between valve closing element 120, 220 and lever 110, 210. The embodiments described in conjunction with spring element 130, 230 arranged axially between disk 140, 240 and lever 110, 210 apply analogously for embodiments in which spring element 130, 230 is arranged between valve closing element 120, 220 and lever 110, 210.

A first contact region 106, 206, which is designed for mutual sliding of valve closing element 120, 220 and lever 110, 210, is formed between valve closing element 120, 220 and lever 110, 210. Furthermore, a second contact region 108, 208, which is designed for mutual sliding of spring element 130, 230 and lever 110, 210, is formed between spring element 130, 230 and lever 110, 210. By providing for mutual sliding on these contact regions (see 106, 206, 108, 208 in FIG. 2a, FIG. 3a, and FIG. 4c), an oblique position of valve closing element 120, 220 relative to the surfaces to be sealed may be reduced. By this means, the function, in particular the sealing function, of valve assembly 100, 200 may be improved.

FIG. 2b shows an enlarged partial section of FIG. 2a, from which additional details regarding contact regions 106, 108 are gathered. Reference is analogously made to FIG. 2b and FIGS. 4b and 4c relating to valve assembly 200 and contact regions 206, 208.

In first contact region 106, 206, valve closing element 120, 220 has a curved sliding contact surface 126, 226, which extends annularly radially outward around cylindrical projection 122. Sliding contact surface 126 of valve closing element 120 thereby extends from bottom 121 of cavity 124 extending in axial direction 120a, 122a opposite the closing direction. Sliding contact surface 226 of valve closing element 220 thereby extends on bottom 221 of cavity 224. Lever 110, 210 has a first sliding contact surface 116, 216, via which it may slide on curved sliding contact surface 126, 226 of valve closing element 120, 220. In the embodiment shown, first sliding contact surface 116 of lever 110 is likewise curved; however, it has a larger radius of curvature than sliding contact surface 126 of valve closing element 120. First sliding contact surface 116 of lever 110 is thereby designed as concave and sliding contact surface 126 of valve closing element 120 is thereby designed as convex (see FIGS. 2a and 2b). Analogously, first sliding contact surface 216 of lever 210 is likewise curved; however, it has a smaller radius of curvature than sliding contact surface 226 of valve closing element 220 (see FIGS. 3a and 3b). First sliding contact surface 216 of lever 210 is thereby designed as convex and sliding contact surface 226 of valve closing element 220 is thereby designed as concave.

Due to this particular embodiment, first sliding contact surface 116, 216 of lever 110, 210 contacts sliding contact surface 126, 226 of valve closing element 120, 220 via a linear contact. Linear contact is hereby to be understood as a linear contact in the circumferential direction. By this means, friction is minimized and a certain movement is ensured between valve closing element 120, 220 and lever 110, 210. In particular, a certain tilting movement of valve closing element 120, 220 relative to lever 110, 210 is desired, by which means, in certain open states of valve assembly 100, 200, an oblique position of valve closing element 120, 220 relative to the surfaces to be sealed or to be closed, for example, valve seat 33 and valve region 42, subsequently explained in greater detail, may be reduced. In alternative embodiments, sliding contact surface 126 of valve closing element 120 or analogously first sliding contact surface 216 of lever 210 may also be designed as conical. To guarantee a certain movement, first sliding contact surface 116 of lever 110 or analogously sliding contact surface 226 of valve closing element 220 are designed correspondingly curved, for example, convexly, as mentioned above. First sliding contact surface 116 of lever 110 or analogously sliding contact surface 226 of valve closing element 220 may also be designed as conical in alternative embodiments. A conical configuration of first sliding contact surface 116 of lever 110 or analogously sliding contact surface 226 of valve closing element 220 would not require any adjustment of curved sliding contact surface 126 of valve closing element 120 or of first sliding contact surface 216 of lever 210, as a linear contact would remain present.

In second contact region 108, 208, lever 110, 210 has a second sliding contact surface 118, 218 on which a first sliding contact surface 136, 236 of spring element 130, 230 may slide.

In the exemplary embodiment of valve assembly 100 from FIG. 2a, spring element 130, 230 is designed as a disk spring. Spring element 130 thereby surrounds cylindrical projection 122 and is arranged between lever 110 and disk 140. Second sliding contact surface 118 of lever 110 is thereby designed as a flat (annular) surface. First sliding contact surface 136 of spring element 130 is correspondingly designed as a flat surface. Analogous to the above mentioned properties of sliding contact surfaces 116, 126 in first contact region 106, sliding contact surfaces 118, 136 in second contact region 108 may also be correspondingly adapted, for example, be designed as curved, conical, and/or contacting one another via a linear contact in alternative embodiments. Spring element 130 additionally has a second sliding contact surface 138 in order to facilitate a sliding of spring element 130 on disk 140 in a third contact region 109 (see, in particular, FIG. 2a).

In the exemplary embodiment of valve assembly 200 from FIG. 4b, spring element 130, 230 is designed as a substantially annular base body 232 with at least three spring arms 234 projecting from an outer periphery of annular base body 232. Spring arms 234 are thereby not connected to one another in the radially outer regions. Spring arms 234 are curved in the radial direction in order to exert a pre-biasing force on lever 210. Second sliding contact surface 218 of lever 210 is thereby implemented as a/an (annular) surface sloping radially outwardly, thus as a convexly curved surface. First sliding contact surface 236 of spring element 230 may thus slide relatively on second sliding contact surface 218 of lever 210. In particular, a relative tilting between spring element 230 and lever 210 is possible due to curved second sliding contact surface 218 of lever 210 and spring arms 234 configured as curved in the radial direction. Due to the radial curve of spring arms 234, first sliding contact surface 236 of spring element 230 arises in particular from the sum of individual sliding contact surfaces of spring arms 234. Sliding is thus exclusively facilitated between spring arms 234 and lever 210. The expression 'exclusively' relates herein only to a sliding between spring element 230 and lever 210, not, however, to other contact regions, for example, sliding between lever 210 and valve closing element 220. One particular embodiment of spring element 230 in FIG. 4c comprises four spring arms 234. Two spring arms 234 are thereby configured differently from the other two. By this means, a directionally-dependent spring force may be set. Alternatively, a spring element 230, which has differently configured spring arms 234, may also comprise more or fewer than four spring arms 234. Analogous to the above mentioned properties of sliding contact surfaces 216, 226 in first contact region 206, sliding contact surfaces 218, 236 in second contact region 208 may also be correspondingly adapted, for example, be designed as curved, conical, and/or contacting one another via a linear contact in alternative embodiments.

In alternative embodiments, spring element 130, 230 may also have a different spring shape, for example, an annular wave spring, a helical spring, or the like.

As is clear, in particular in the sectional depictions FIGS. 1a, 2a, 3a and 4a, valve closing element 120, 220 is designed as substantially hat-shaped (in FIGS. 1a, 2a, and 4a, the valve closing element is depicted similarly to a hat on a head). In other embodiments, valve closing element 120, 220 may also have other suitable shapes, for example, a bowl shape, a cylindrical shape, or other, in particular, rotationally-symmetrical shapes.

Valve section 112, 212 is thereby designed as stepped-shaped in order to project into cavity 124, 224. Valve section 112, 212 and spring element 130, 230 are arranged in cavity 124, 224 of valve closing element 120, 220.

As FIG. 1a and FIG. 4a show, valve assembly 100, 200 additionally comprises a spindle 150, 250. Spindle 150, 250 is connected to lever 110, 210 to displace valve closing element 120, 220. Spindle 150, 250 is designed to be rotatably mounted in a housing, in particular, rotatably mounted in a turbine housing 30. With regard to this, an axis of rotation 152a, 252a of spindle 150, 250 is indicated in FIGS. 1a and 4a, from which the resulting movement of valve assembly 100, 200 may be derived. Thus, spindle 150, 250 functions for the rotatable or displaceable mounting of valve assembly 100, 200. Lever 110, 210 and spindle 150, 250 are thereby integrally formed. In alternative embodiments, lever 110, 210 and spindle 150, 250 may also be welded to each other. Lever 210 has a lever length 210a, which runs between axis of rotation 252a of spindle 250 and center axis 220a of valve closing element 220 (see FIG. 12a). By varying lever length 210a, different valve characteristics may be adjusted (see below). Even if, this is shown only be way of example in connection with valve assembly 200, the feature of the lever length may also be understood as analogously applicable to lever 110 of valve assembly 100 of the first embodiment.

Figure 11:
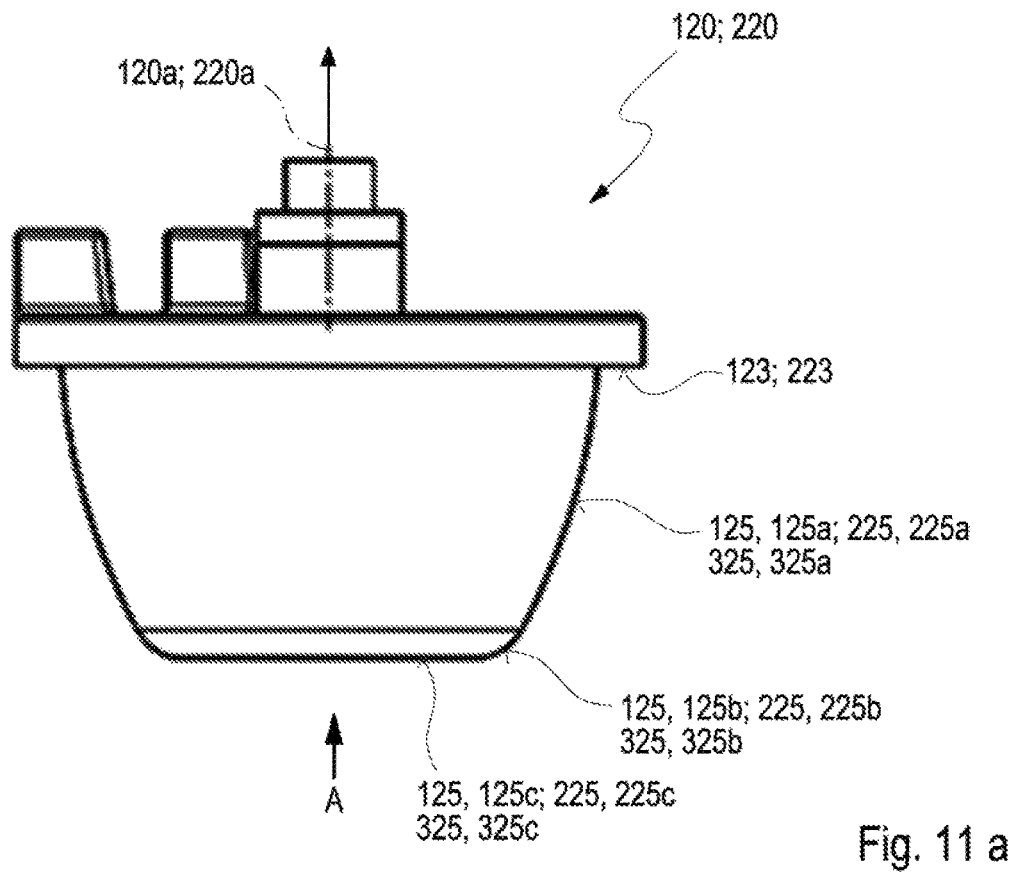
FIGS. 11a-11b show an oval embodiment of the valve closing element in a side view and in a plan view from below.
Figure 11:
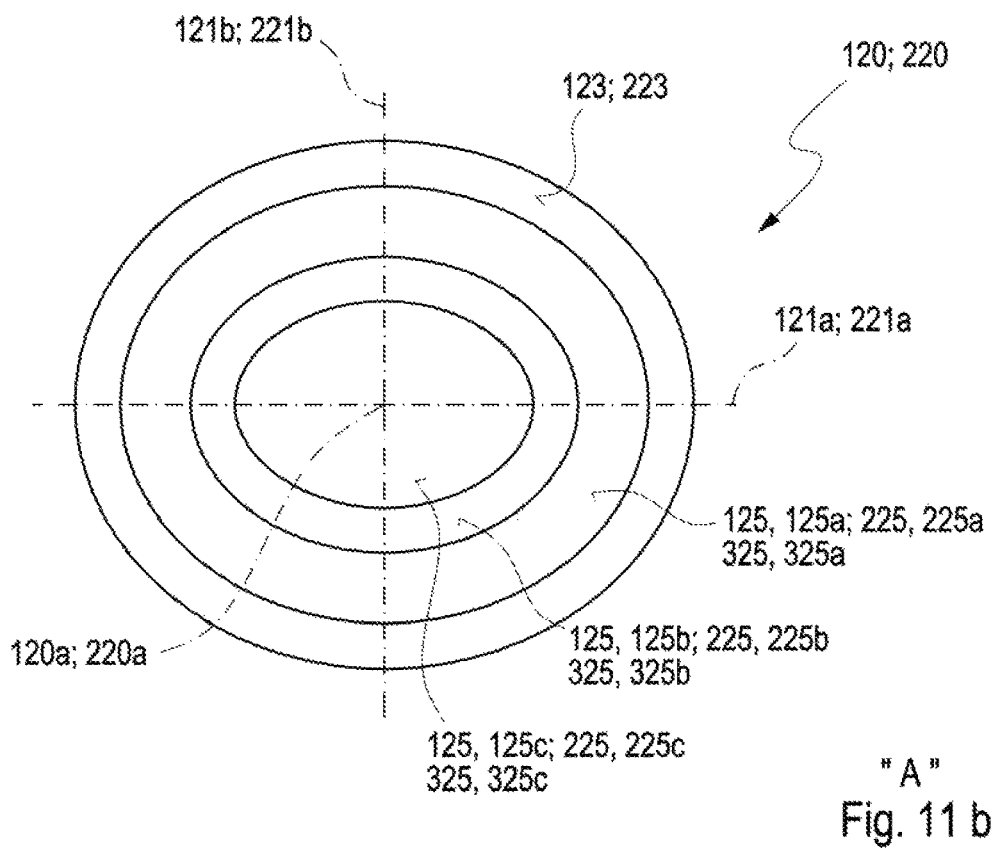

In general, valve closing element 120, 220 has an inner contour 128, 228 and an outer contour 129, 229. Outer contour 129, 229 is thereby substantially bowl shaped. Furthermore, outer contour 129, 229 is configured substantially rotationally symmetrical. 'Substantially' relates here to a shape, which may deviate slightly from a rotationally symmetrical shape, for example, having a slightly oval base form, or having the recesses in the outer contour as subsequently explained. Outer contour 129, 229 and also the entire valve closing element 120, 220 may thereby be designed as oval. In particular, outer contour 129, 229 or valve closing element 120, 220 may be designed as an ellipse. With regard to this, FIGS. 11a and 11b show an elliptical valve closing element 120, 220. A primary axis 121a, 221a and an auxiliary axis 121b, 221b of the ellipse are clear in FIG. 11b. Primary axis 121a, 221a should thereby run along a valve region 42 (not depicted here, see, e.g., FIG. 5b), which extends between first spiral 36 and second spiral 38. Ellipse-shaped in this case means basically and preferably the shape of an ellipse. This is also depicted in FIG. 11b. However, in variants, there may also be slight deviations from the exact shape of an ellipse. By changing the dimensions of primary axis 121a, 221a, and/or of auxiliary axis 121b, 221b, a fine adjustment of an opening surface of bypass opening 50 or of a ratio of the opening surface in a connection region 40 between first spiral 36 and second spiral 38 and of the opening surface of bypass opening 50 may be carried out (see also explanations regarding valve characteristics below). Thus, the turbine efficiency may again be improved. Furthermore, material and necessary installation space may be saved due to ellipse-shaped valve closing element 120, 220. This means that valve closing element 120, 220 is smaller overall and requires less actuating energy for actuation. The oval or elliptical shape may be manufactured by a casting method or a deposition method with or without a specialized tool. The oval form of valve closing element 120, 220 may be used to achieve a preferred valve characteristic. For example, a reduced opening surface of bypass opening 50 may be achieved by correspondingly dimensioning primary axis 121a, 221a and/or auxiliary axis 121b, 221b.

Figure 5:
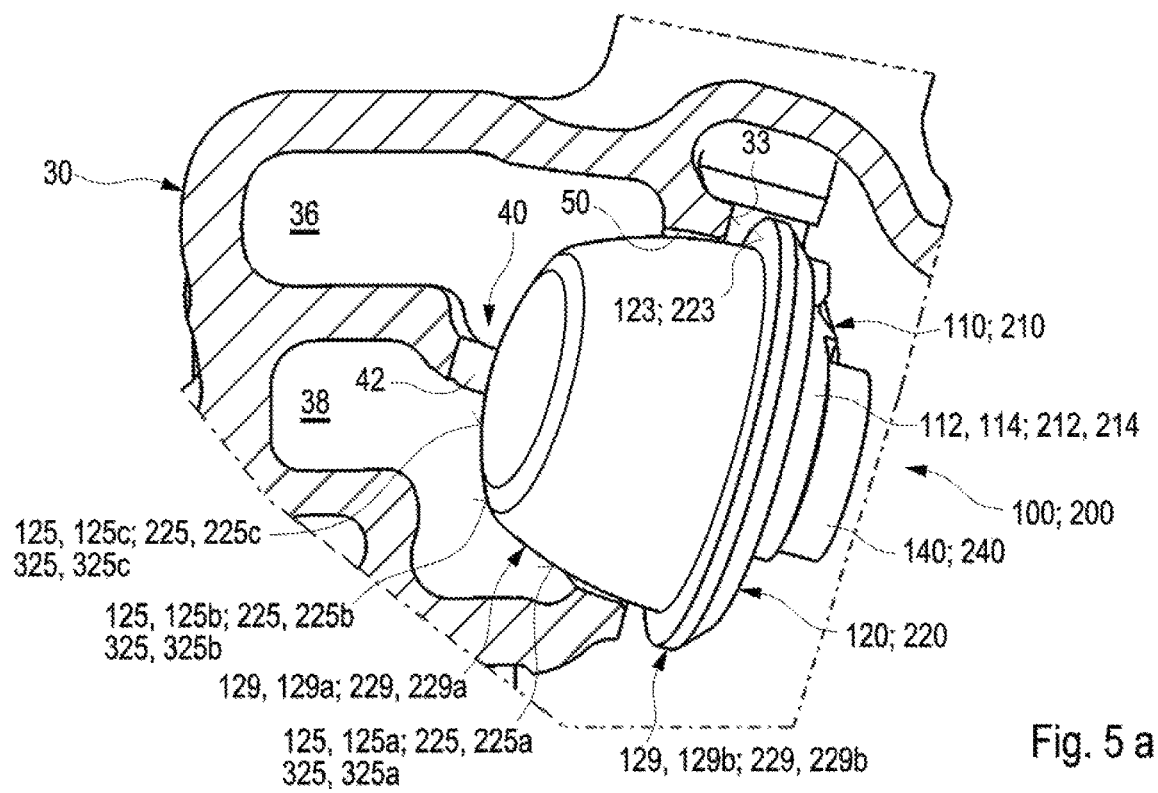
FIG. 5a shows a side view of the valve assembly according to the invention in an intermediate position in a sectionally depicted turbine housing.
FIG. 5b shows a side view of the valve assembly according to the invention in an intermediate position in a sectionally depicted turbine housing as in FIG. 5a, however with a valve closing element whose outer contour has recesses.
Figure 5:
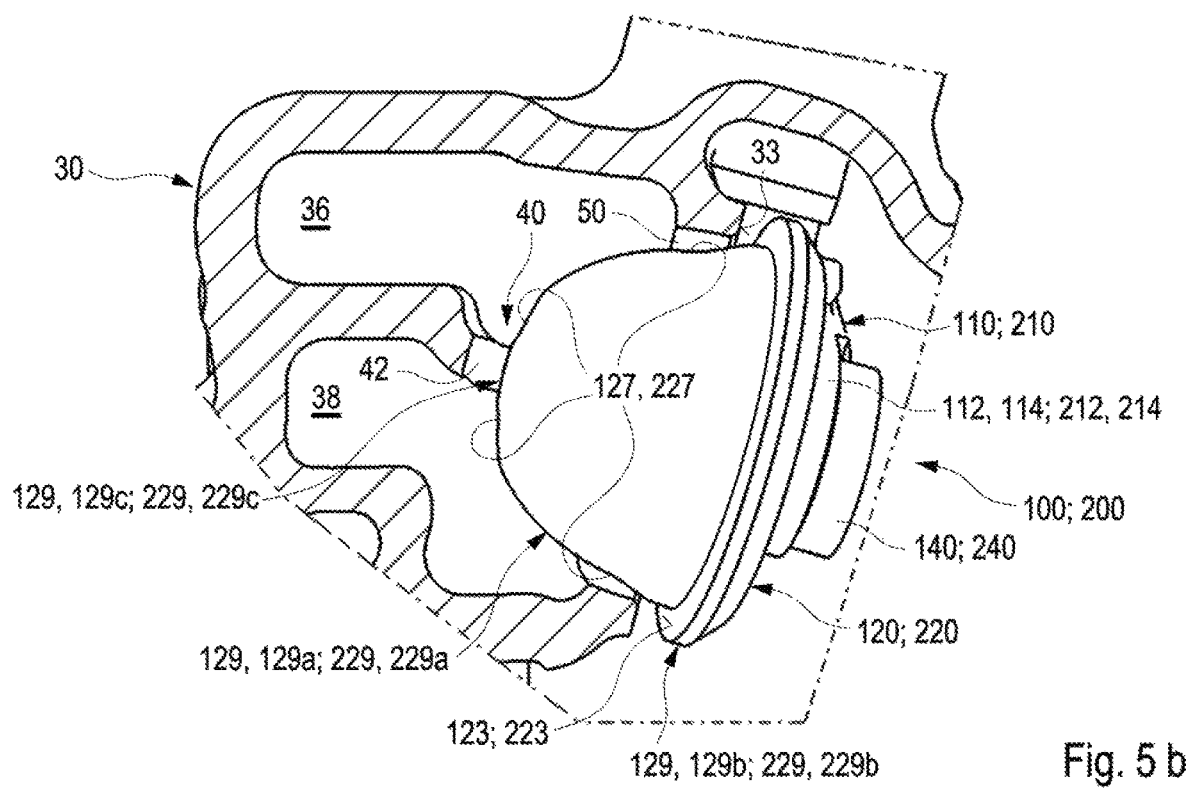
Figure 10:
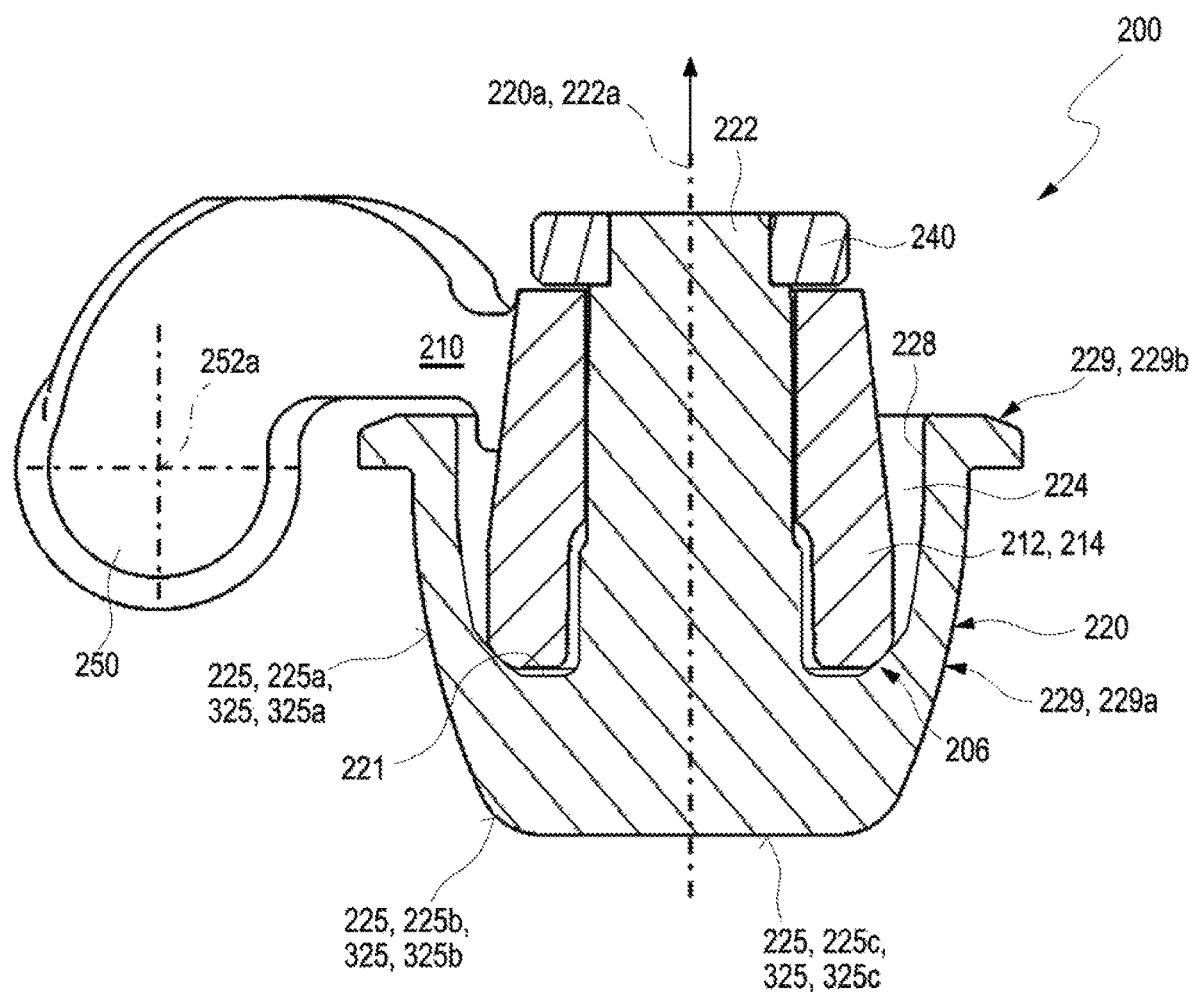
FIGS. 10a-10b show sectional side views of the valve assembly according to the invention according to the second embodiment in a specific configuration with a flat bottom.
Figure 10:
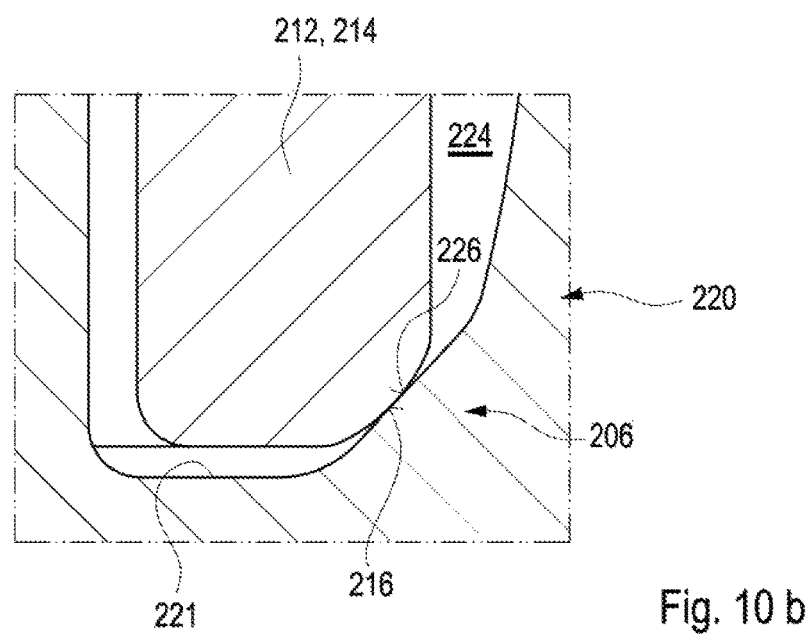

Outer contour 129, 229 comprises a first contour section 129a, 229a and a second contour section 129b, 229b (see FIG. 5a). First contour section 129a, 229a may be substantially defined by three surfaces 125, 225. All three surfaces 125, 225 are thereby defined by radii 325 of different curvatures. Specifically, there is a first surface 125a, 225a, a second surface 125b, 225b, and a third surface 125c, 225c. First surface 125a, 225a is formed by a first radius 325a; second surface 125b, 225b is formed by a second radius 325b; and third surface 125c, 225c is formed by a third radius 325c (see FIG. 5a). First surface 125a, 225a and second surface 125b, 225b thereby extend in the circumferential direction around valve closing element 120, 220 and together with third surface 125c, 225c form first contour section 129a, 229a. In alternative embodiments, surfaces 125, 125a, 125b, 125c; 225, 225a, 225b, 225c may also be configured differently. For example, at least two of the three surfaces 125, 125a, 125b, 125c; 225, 225a, 225b, 225c may also be formed as flat. In particular, third surface 125c, 225c is eligible for this. With regard to this, FIG. 10a shows, for example, a third surface 225c designed as flat. This means that third radius 325c approaches infinity. Alternatively or additionally, first surface 125a, 225a may be correspondingly designed (not shown).

In the embodiments shown, surfaces 125, 225 of first contour section 129a, 229a are configured in such a way that, in the installed state, contour section 129a, 229a may be brought into engagement with a complementary-shaped valve region 42 in a connection region 40 between first spiral 36 and second spiral 38 (see FIG. 5a and FIG. 5b). It is particularly clear in FIG. 5a, that surfaces 125, 225 of first contour section 129a, 229a are configured in such a way that, during a displacement of valve closing element 120, 220 from a closed position into an open position, first contour section 129a, 229a initially continuously opens only connection region 40 for the overflow of exhaust gases between first spiral 36 and second spiral 38, and, starting at a specific degree of opening of valve closing element 120, 220, additionally effects a continuous opening of bypass opening 50. In regards to this, FIG. 5a shows an intermediate position of valve assembly 100, 200 in a turbine housing 30. It is clear that connection region 40 for the overflow of exhaust gases between first spiral 36 and second spiral 38 is already farther open than bypass opening 50. It is additionally clear that this ratio, thus the degree of opening of connection region 40 in relation to the degree of opening of bypass opening 50, may be influenced or controlled by a corresponding configuration of outer contour 129, 229 of valve closing element 120, 220 and by a corresponding setting of valve assembly 100, 200.

Figure 6:
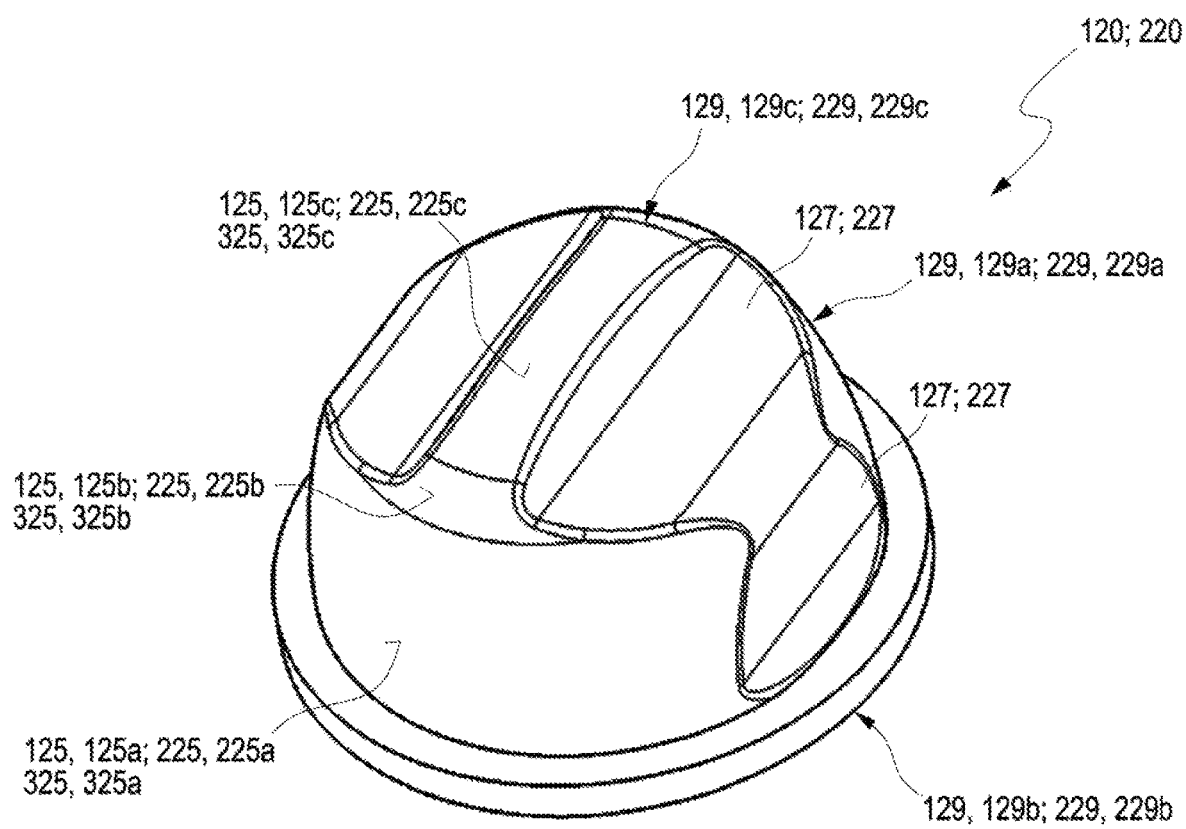
FIGS. 6a-6b show an isometric view and a side view of a valve closing element according to the invention whose outer contour has recesses.
Figure 6:
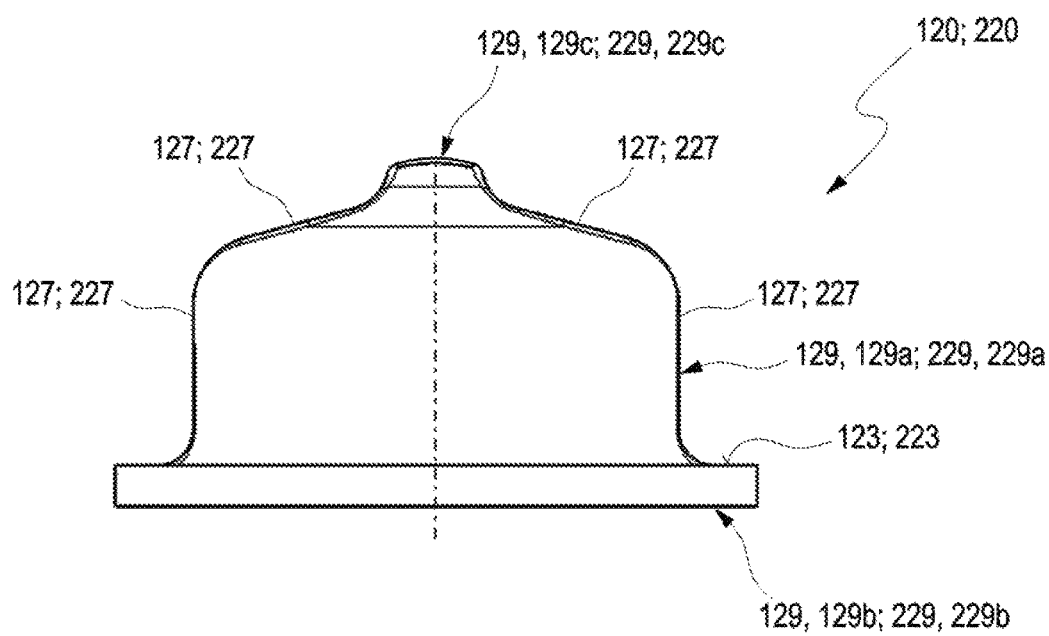

In regard to this, FIG. 5b, FIG. 6a, and FIG. 6b show an alternative configuration of outer contour 129, 229 of valve closing element 120, 220. Outer contour 129, 229 thereby has recesses 127, 227. By this means, a bypass flow is increased. In particular, the just mentioned ratio of the degree of opening is shifted to the sides of bypass opening 50. Recesses 127, 227 are arranged in first contour section 129a, 229a. In particular in FIG. 6a and FIG. 6b, it is clear that recesses 127, 227 are arranged on side walls of first contour section 129a, 229a and opposite by 180°. Furthermore, recesses 127, 227 are configured in such a way that they form a web-shaped elevation 129c, 229c in first contour section 129a, 229a in outer contour 129, 229, said elevation may be brought into engagement with a complementary-shaped valve region 42 in connection region 40 between first spiral 36 and second spiral 38.

It is clear in FIG. 5b, in particular in comparison with FIG. 5a, that recesses 127, 227 are configured in such a way that, during a displacement of valve closing element 120, 220 from a closed position into an open position, first contour section 129, 229 virtually simultaneously continuously opens bypass opening 50 and connection region 40. In regards to this, FIG. 5b shows an intermediate position of valve assembly 100, 200 in a turbine housing 30. It is clear that connection region 40 for the overflow of exhaust gases between first spiral 36 and second spiral 38 is already farther open than bypass opening 50. In particular, a comparison between an embodiment with recesses (FIG. 5b) and an embodiment without recesses (FIG. 5a) with a valve assembly 100, 200, which is in the same intermediate position in both embodiments, shows that bypass opening 50 of the embodiment with recesses (FIG. 5b) is already father opened that bypass opening 50 in the embodiment without recesses (FIG. 5a).

Second contour section 129b, 229b forms an annular sealing surface 123, 223, which is designed in such a way that, in the installed state, it may be brought into contact with a valve seat 33 of turbine housing 30 in order to close bypass opening 50 in the connection region 40 between first spiral 36 and second spiral 38.

Figure 7:
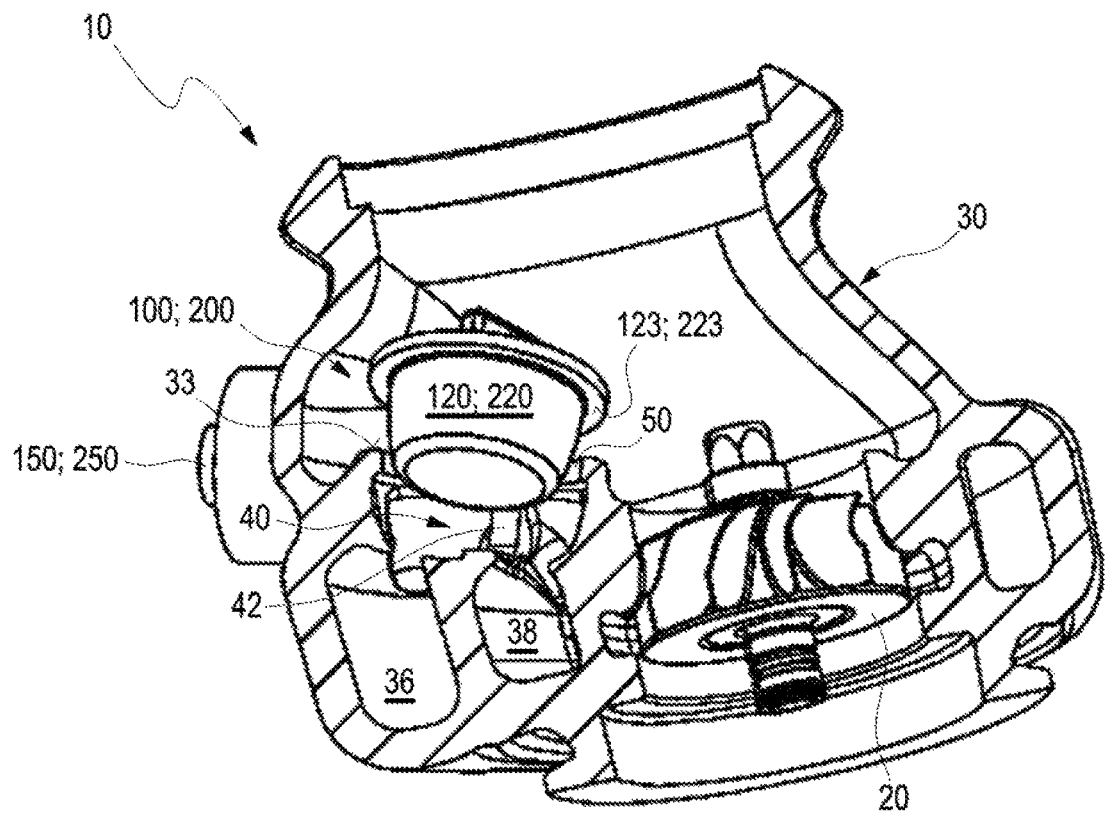
FIG. 7a shows a side view of a first embodiment of the turbine according to the invention with a valve assembly according to the invention.
FIG. 7b shows a view of the turbine from FIG. 7a, in which the turbine housing clearly shows the connection region, spirals, bypass opening and turbine wheel.
Figure 7:
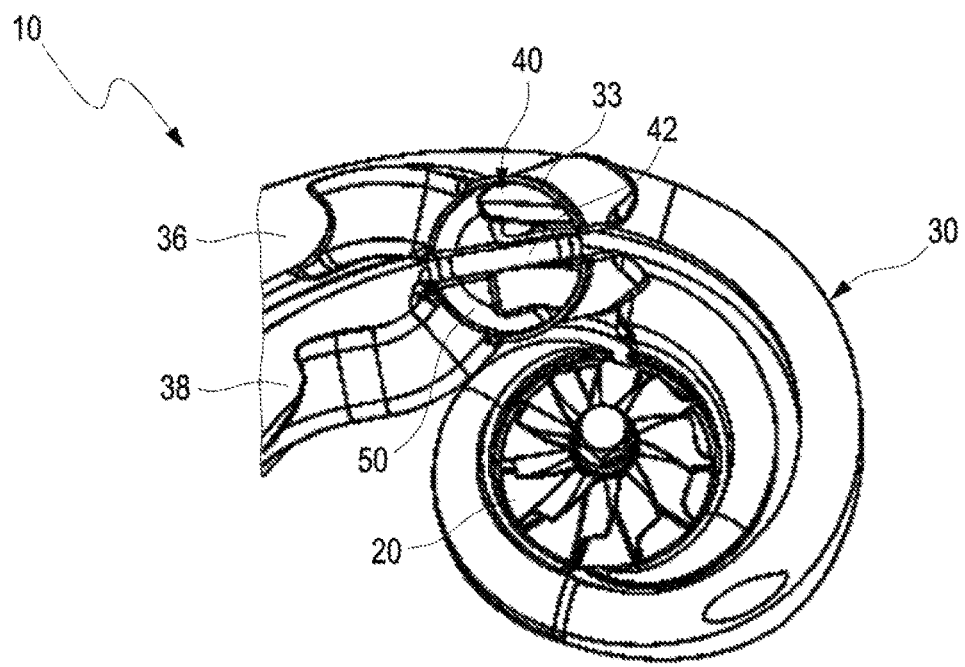

Valve closing element 120, 220 is designed in such a way that, in the installed state, it may be brought into engagement with a valve region 42 in a connection region 40 between first spiral 36 and second spiral 38 (see FIG. 7).

Valve closing element 120, 220 additionally comprises an annular sealing surface 123, 223 (see FIGS. 1a and 2a). Sealing surface 123, 223 is thereby designed in such a way that, in the installed state, it may be brought into contact with a valve seat 33 of a turbine housing 30 in order to close a bypass opening 50 in a connection region 40 between first spiral 36 and second spiral 38 (see FIG. 7).

Figure 9:
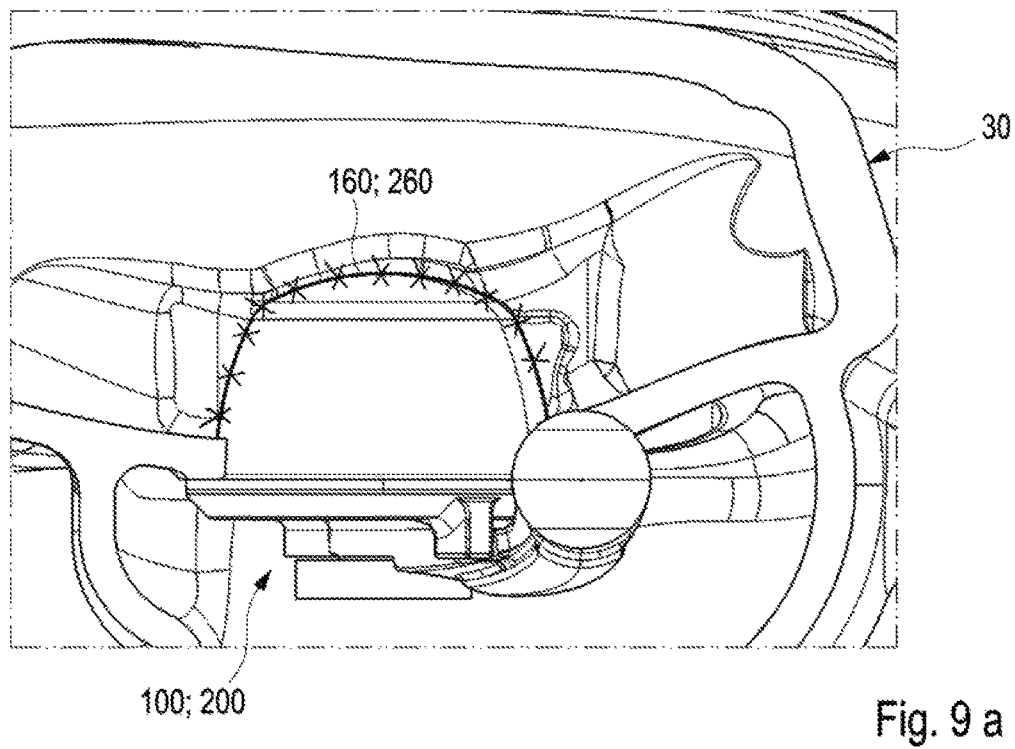
FIGS. 9a-9f show different depictions of the valve assembly according to the invention with a seal in different embodiments.
Figure 9:
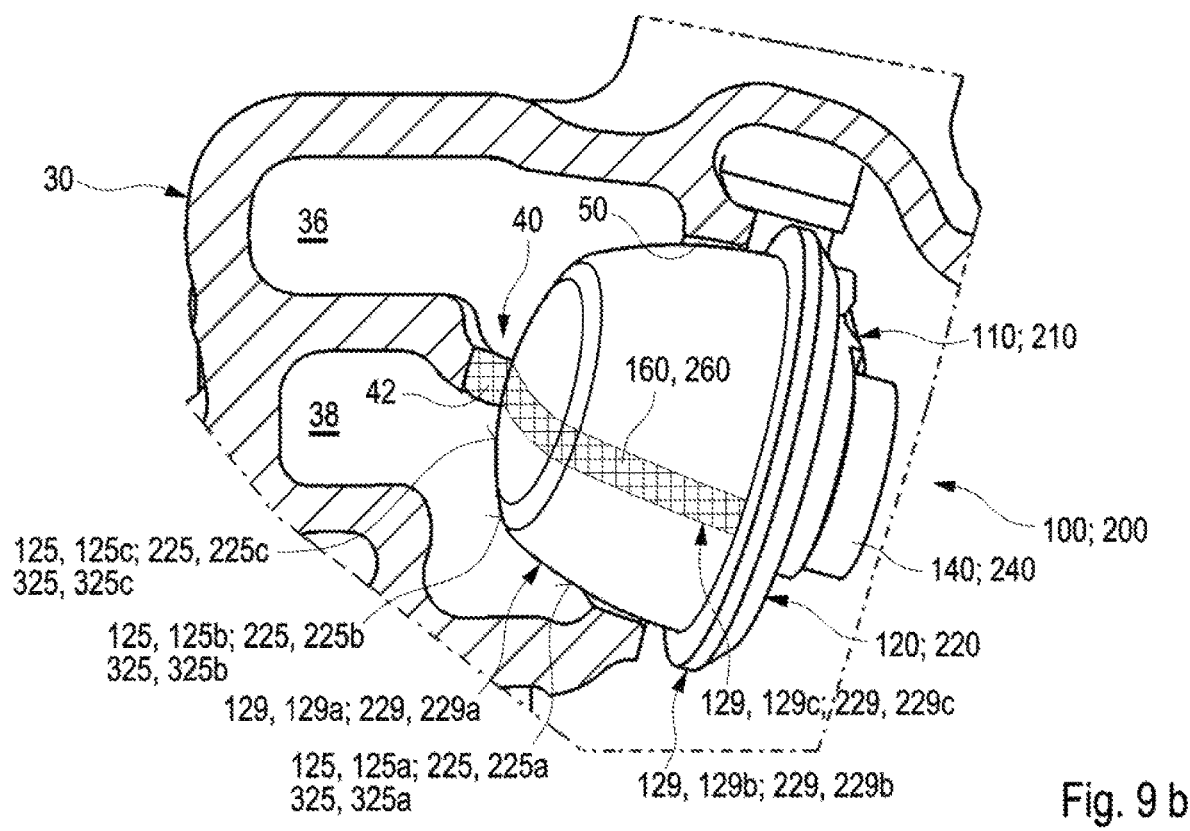
Figure 9:
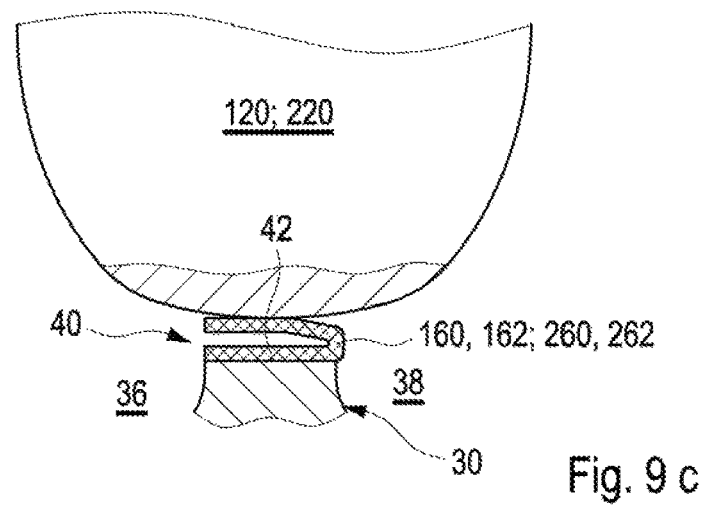
Figure 9:
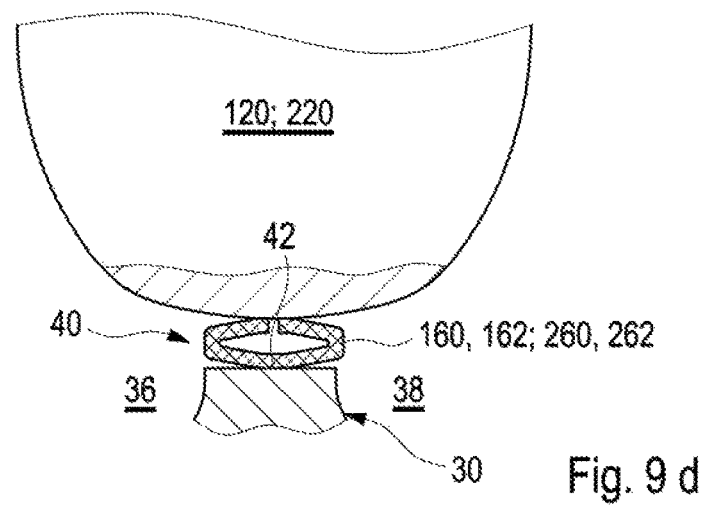
Figure 9:
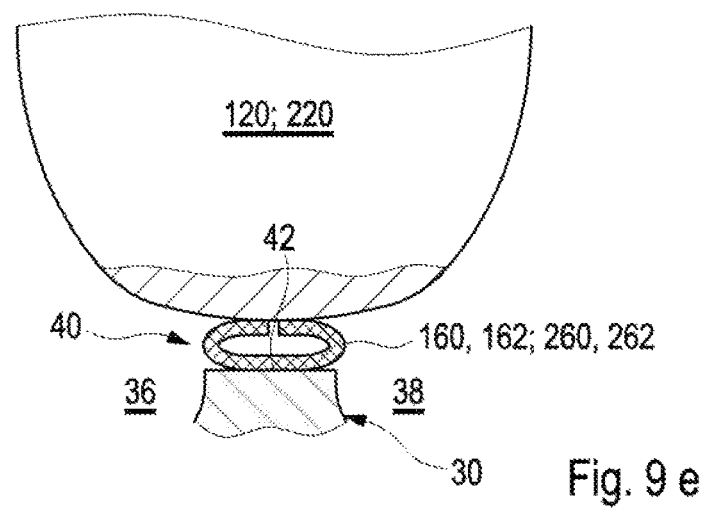
Figure 9:
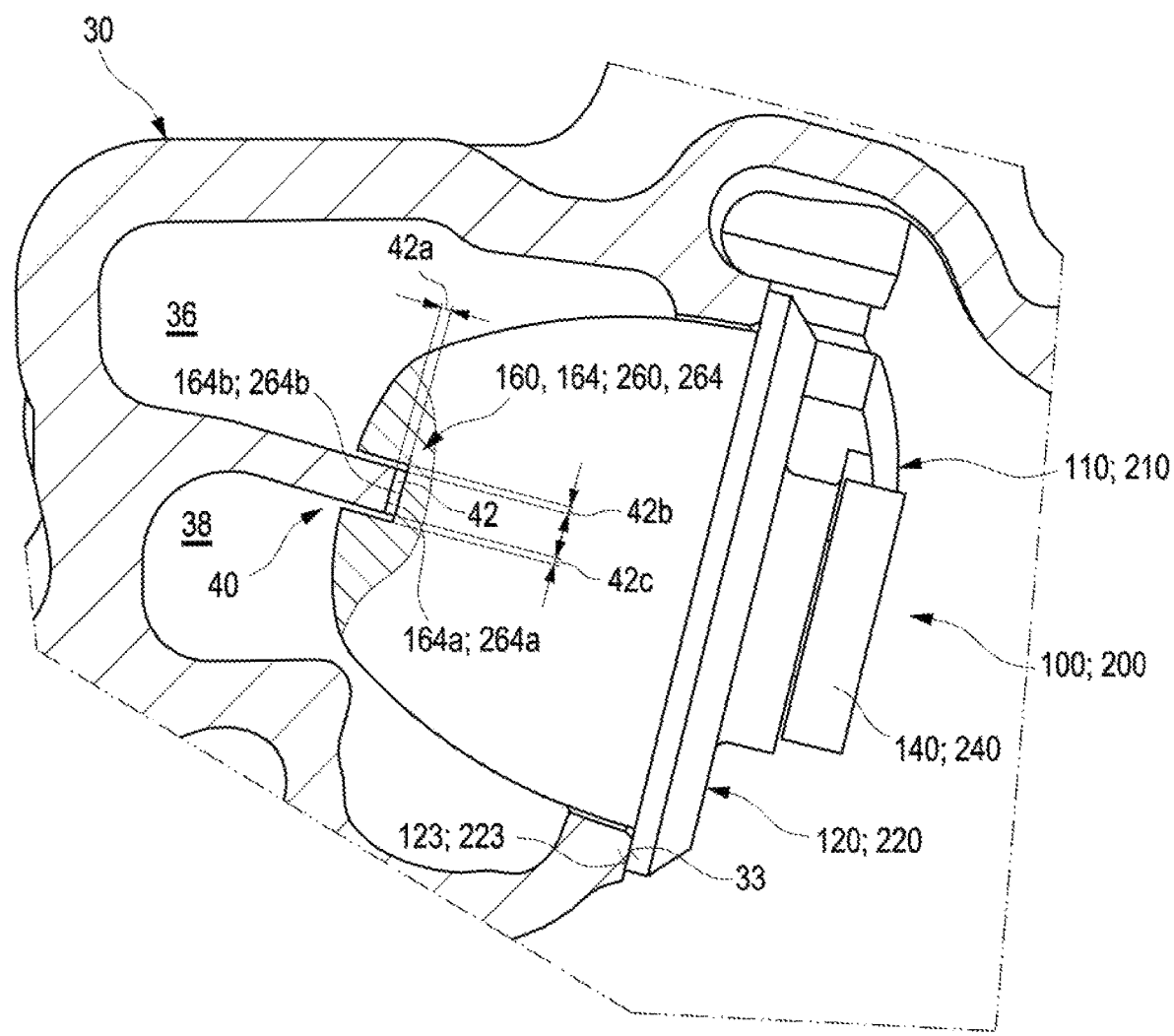

In some embodiments, as shown in FIGS. 9a to 9f, valve assembly 100, 200 comprises a seal 160, 260. Seal 160, 260 is designed between valve closing element 120, 220 and connection region 40. FIGS. 9a and 9b schematically indicate the region (see, in particular, the cross-hatched surface in FIG. 9b) on valve closing element 120, 220 and/or on valve region 42 in which seal 160, 260 may be arranged. The seal may be designed as either an additional sealing element 162, 262 (see FIGS. 9c to 9e) or as a labyrinth-like seal 164, 264 (see FIG. 9f). Combinations are also possible. Basically, sealing element 162, 262 may be arranged on valve closing element 120, 220 or on valve region 42.

Sealing element 162, 262 may be fixed on valve closing element 120, 220 or on valve region 42 by welding, pressing, riveting, gluing, or in an integrated shaping method (in particular casting methods). Other common fixing methods known to the person skilled in the art, not listed here, are also possible. In order to list only a few examples, sealing element 162, 262 may be manufactured from a material net/wire mesh, from a sheet metal material, or from another suitable material. As is shown in FIGS. 9c to 9e, a cross-sectional shape of sealing element 162, 262 may likewise be designed differently. For example, FIG. 9c shows a sealing element 162, 262 with a V-shaped cross section; FIG. 9d shows a sealing element 162, 262 with a diamond or rhombus-shaped cross section; and FIG. 9e shows a sealing element 162, 262 with a C-shaped cross section. The different cross sections each thereby have at least one opening. Other cross sections of seals familiar to the person skilled in the art are possible.

FIG. 9f shows a labyrinth-like seal 164, 264. Valve region 42 and valve closing element 120, 220 thereby engage in the closing direction into one another in such a way that an overlapping of valve region 42 and valve closing element 120, 220 is present, at least in the closed state of valve closing element 120, 220, in the direction from first spiral 36 to second spiral 38. Labyrinth-like seal 164, 264 thereby comprises an elevation 164a, 264a following the course of valve region 42 (see also cross-hatched region from FIG. 9b). Furthermore, labyrinth-like seal 164, 264 comprises a depression 164b, 264b following the course of valve region 42, and they engage into one another at least in the closed state of valve closing element 120, 220. In the example from FIG. 9f, elevation 164a, 264b is formed on valve region 42 and depression 164b, 264b is formed on valve closing element 120, 220. In alternative embodiments, elevation 164a, 264a may, however, be formed on valve closing element 120, 220 and depression 164b, 264b may be formed on valve region 42 (not shown). A cross section of labyrinth-like seal 164, 264 is rectangularly shaped in FIG. 9f. Alternatively, however, the cross section may also follow other shapes, for example, a round shape, a zig-zag shape, a corrugated shape, a spline-like shape, or another shape that is suitable for sealing between spirals 36, 38. Due to seal 160, 260, an inner leakage between first spiral 36 and second spiral 38 may be at least reduced. By this means, exhaust gas pulses arising from the cylinders of an engine may be better separated and better used by the turbine (thus, used for driving the turbine). By this means, in turn, the responsiveness of the engine may be improved such that the reaction time for generating a torque is reduced. This leads to an increased efficiency over all.

The at least one labyrinth-like seal 164, 264 may not completely prevent an inner leakage between first spiral 36 and second spiral 38. This is not possible, because at least one first gap 42a, which is oriented in the closing direction, is provided between valve closing element 120, 220 and valve region 42 (see FIG. 9f). Furthermore, laterally adjacent to first gap 42a, a second gap 42b and a third gap 42c are provided on the flanks of valve region 42. Gaps 42a, 42b, 42c may have different widths. On the one hand, friction may be prevented by gaps 42a, 42b, 42c and on the other side, thermal deformation may be compensated. Furthermore, it is ensured by gaps 42a, 42b, 42c that annular sealing surface 123, 223 of valve closing element 120, 220 is engageable flush with valve seat 33.

Figure 12:
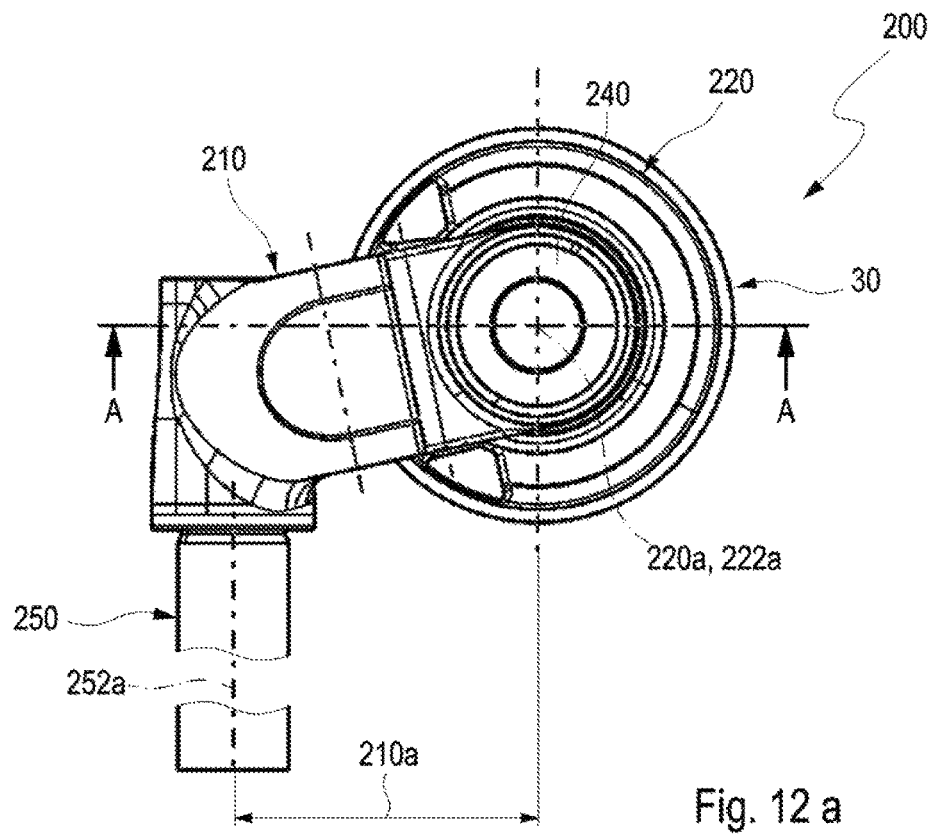
FIGS. 12a-12b show by way of example the second embodiment of the valve assembly with different variable setting parameters in a top view and in a sectional side view.
Figure 12:
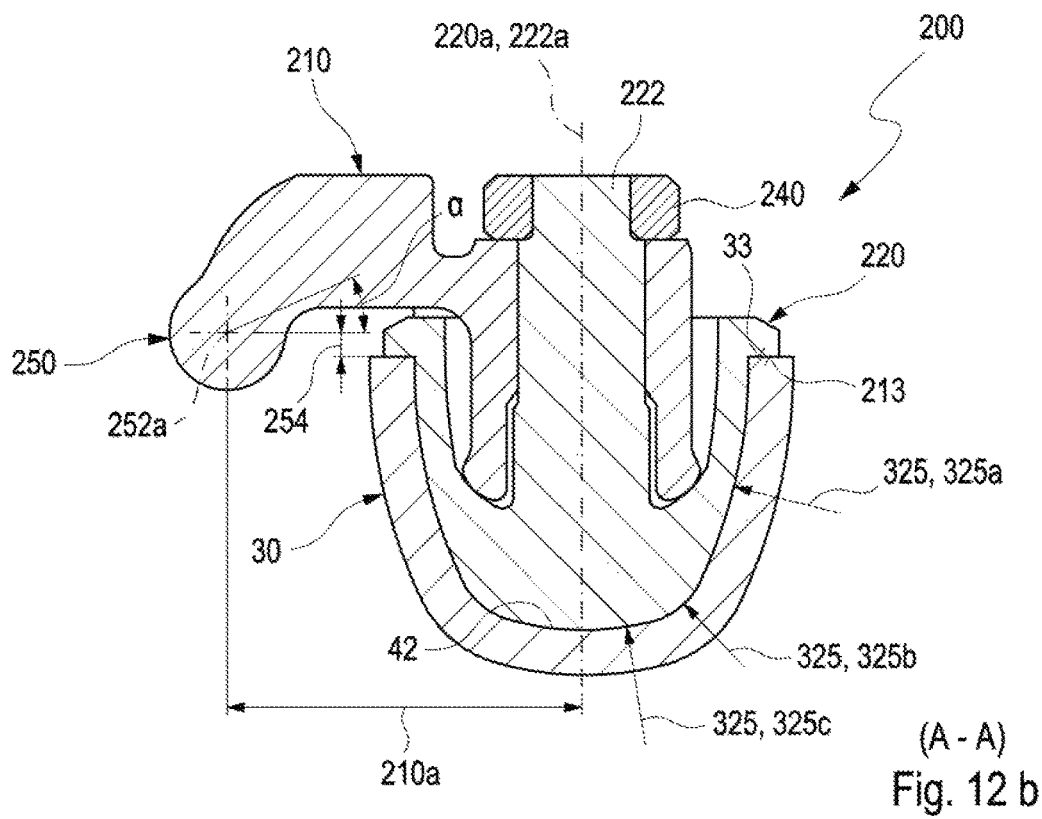
Figure 13:
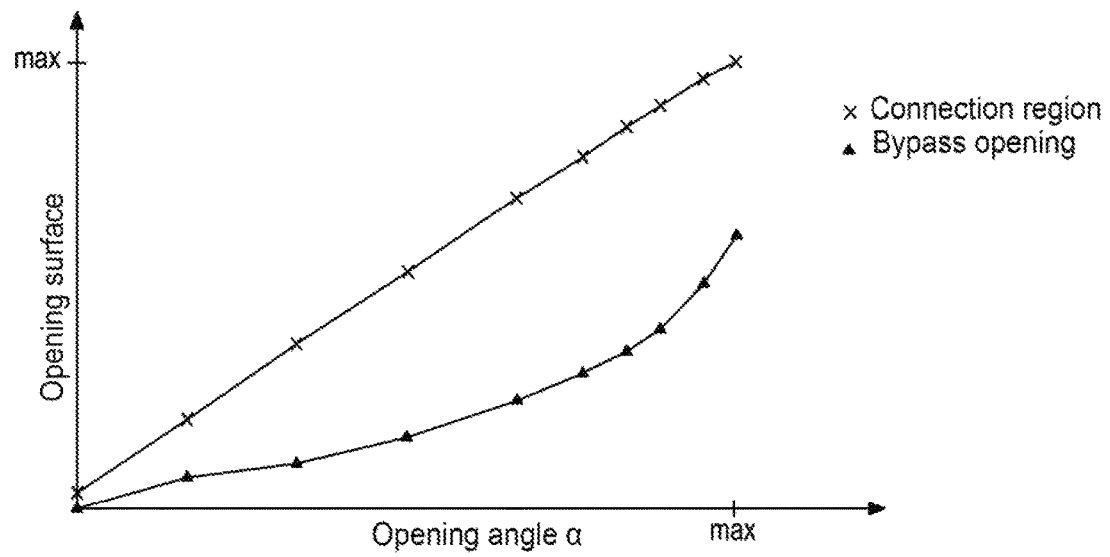
FIG. 13a shows the relationship between the degree of opening of the valve assembly and the opening surface in the connection region between the first spiral and the second spiral and also the opening surface of the bypass opening.
FIG. 13b shows different valve characteristics in contrast to two different combinations of setting parameters.
Figure 13:
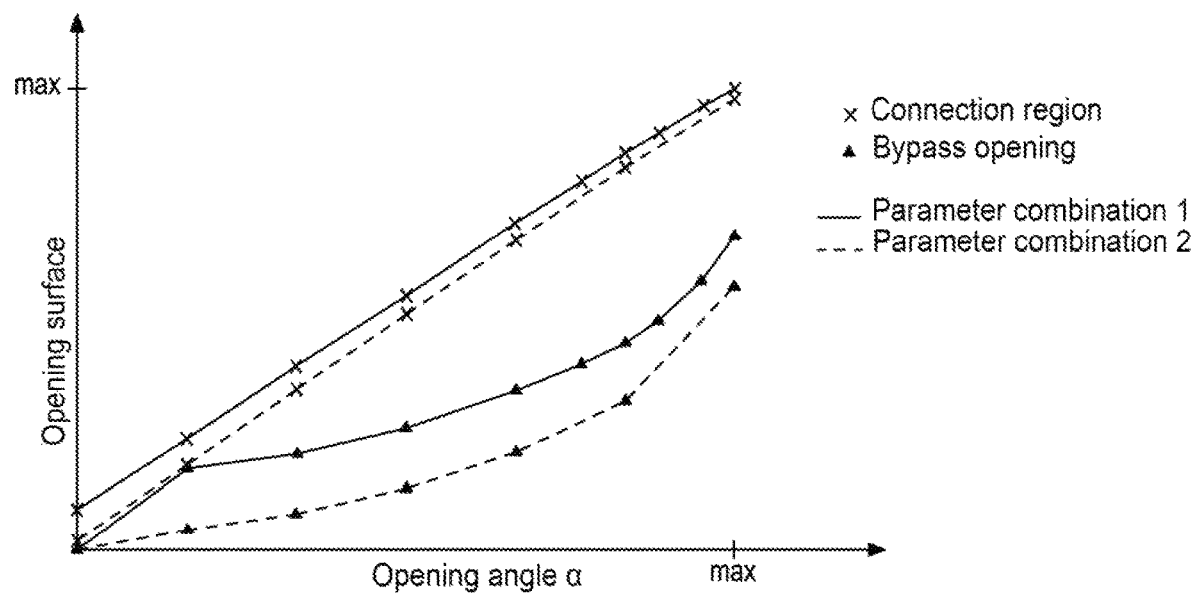

FIGS. 12a and 12b show an exemplary valve assembly 200 based on which different setting parameters for modifying the valve characteristics are explained (see FIGS. 13a and 13b). Even if the following embodiments are only explained in conjunction with valve assembly 200 of the second embodiment, these are also applicable to valve assembly 100 of the first embodiment. Basically, different valve characteristics may be achieved by the different configurations of different valve features (combination of setting parameters). As there are innumerable variation possibilities, only four different parameters are explained here by way of example, whose combination achieve different valve characteristics. These include:

1) Lever length 210a
2) Radii 325a, 325b, 325c
3) Opening angle α
4) Distance 254

As already explained above, FIG. 12a illustrates lever length 210a, which runs between axis of rotation 252a of spindle 250 and center axis 220a of valve closing element 220 (see). Lever length 210a may have values between 10 mm and 50 mm, preferably values between 15 mm and 35 mm, and particularly preferably values between 20 mm and 30 mm. Radii 325a, 325b, 325c, likewise introduced above, may be adjusted in different ways. First radius 325a may have values 25 mm to infinity, preferably between 30 mm and 60 mm, and particularly preferably between 35 mm and 50 mm. Second radius 325b may have values 1 mm to 10 mm, preferably between 2 mm and 6 mm, and particularly preferably between 3 mm and 4 mm. Third radius 325c may have values 20 mm to infinity, preferably between 30 mm and 60 mm, and particularly preferably between 25 mm and 30 mm. In particular in cases in which radius 325c has a value of approximately infinity, alternative parameters may be defined. In this case, in particular a distance of valve seat 213 to bottom 221 of valve closing element 220 should be mentioned. This distance may have values in the range of 20 mm to 60 mm, preferably values in the range of 20 mm to 30 mm. Opening angle α of valve closing element 220 (also called valve opening angle α) is schematically indicated in FIG. 12b. Even when valve closing element 220 is depicted in the closed position (opening angle α=0°), it is indicated how opening angle α extends when valve closing element 220 is moved from the closed into the open position.

Opening angle α may have a movement range between 0° and 45°, preferably values between 0° and 30°, and particularly preferably between 0° and 20°. Furthermore, a distance 254 between axis of rotation 252*a* of spindle 250 and sealing surface 223 or valve seat 33 is shown in FIG. 12*b* (in the closed position). This distance 254 may lie in a range between −2 mm and +2 mm, preferably in a range between −1 mm and +1 mm, and is particularly preferably 0 mm. In addition, there are many other parameters, for example, the shape of the valve (elliptical/circular), which influence the valve characteristics. The above parameters and, optionally, other parameters may be individually or multiply or also all changed or selected in order to determine the valve characteristics. The selection of individual, multiple, or all parameters is thereby combinable with all above embodiments of valve assembly 100, 200. For example, outer contour 129, 229 may be used as an additional or alternative parameter to the four parameters listed above. The valve characteristics may be influenced by the corresponding configuration of outer contour 129, 229. For example, as already explained above, recesses 127, 227 may be provided in outer contour 129, 229 (see, in particular, FIGS. 3*a* and 6*a*). By this means, for example, a ratio of the opening surface of connection region 40 and the opening surface of bypass opening 50, as these are explained later in greater detail, may be enlarged (FIG. 3*a*) or reduced (FIG. 6*a*).

FIG. 13*a* shows an exemplary valve characteristic for a specific combination of setting parameters with the following values: lever length 210*a*=30 mm, first radius 325*a*=45 mm, second radius 325*b*=5.7 mm, third radius 325*c*=29.6 mm, opening angle α=0° to 30°, distance 254=2 mm. Valve characteristics are understood here to mean in particular the behavior of the valve assembly at different opening angles α ((from the minimum opening angle (here 0°) to the maximum opening angle (here 30°). Valve assembly 100, 200 is designed for controlling two different regions:

controlling an overflow of exhaust gases between first spiral 36 and second spiral 38
controlling bypass opening 50.

This means, that the behavior of valve assembly 100, 200, expressed primarily in different opening surfaces of these two regions, thus the opening surface of connection region 40 (indicated with Xs) and the opening surface of bypass opening 50 (indicated with triangles) at different opening angles α. It is clear in FIG. 13*a* that the curves of the two opening surfaces are fundamentally different and that their curves and their ratios vary at a change in opening angle α. In particular, the ratio of these two opening surfaces at different opening angles α is thereby characteristic for valve assembly 100, 200 and may be varied by the individual/multiple or all setting parameters described above (and other parameters). In regards to this, FIG. 13*b* shows a comparison of a first exemplary combination of setting parameters (continuous line) and a second exemplary combination of setting parameters (dashed line). It is thereby clear that both the curves of the two opening surfaces and also their ratio may be adjusted or optimized with respect to the desired demands.

Figure 8:
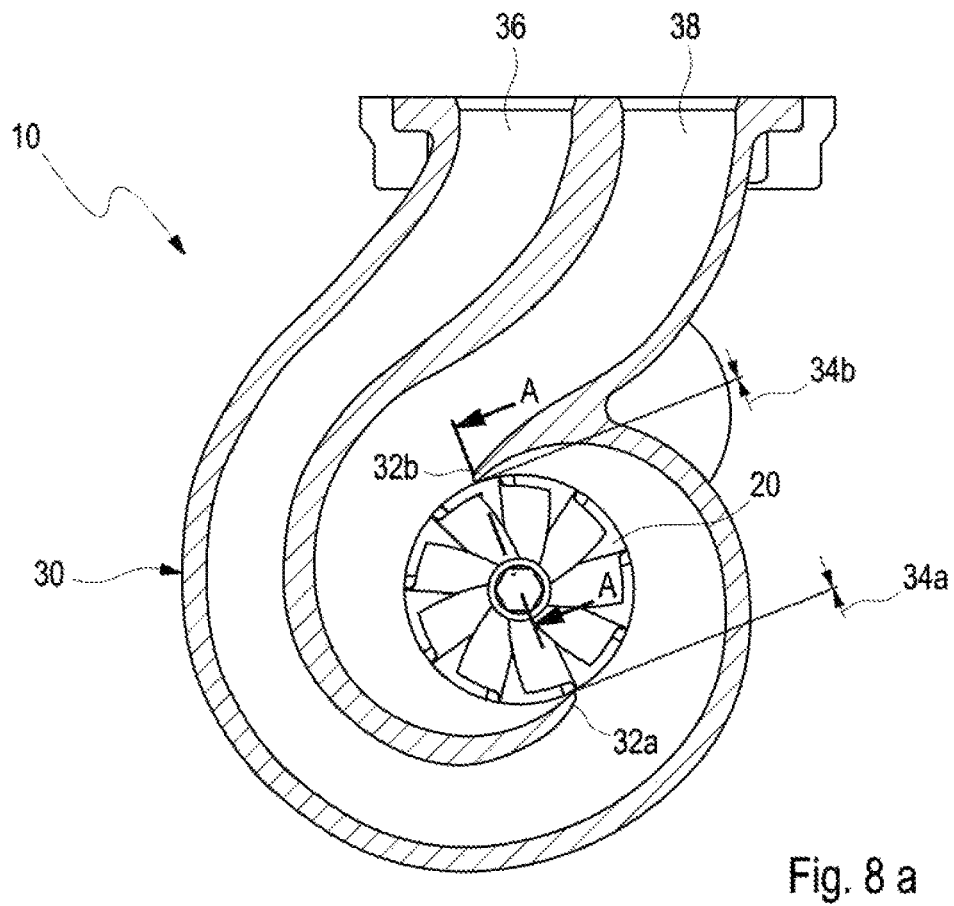
Figure 8:
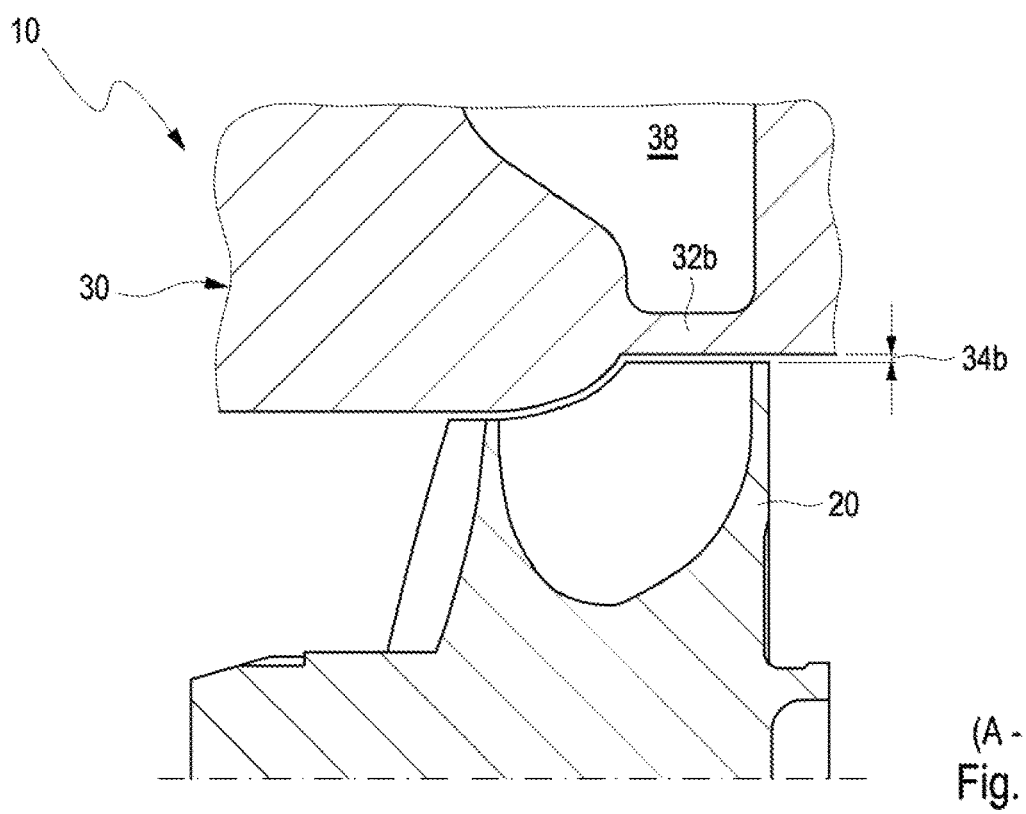

A multi-scroll turbine 10 according to the invention for an exhaust gas turbocharger is depicted in FIGS. 7 and 8. Multi-scroll turbine 10 comprises a turbine wheel 20, a turbine housing 30 with a first spiral 36 and a second spiral 38, a connection region 40, in which first spiral 36 and second spiral 38 are fluidically connected to each other. Furthermore, multi-scroll turbine 10 comprises a bypass opening 50, which is arranged in connection region 40. In addition, multi-scroll turbine 10 has a valve assembly 100, 200 according to any one of the previous embodiments. Valve assembly 100, 200 is thereby arranged at least partially in connection region 40 so that valve closing element 120, 220 may interact with connection region 40 and bypass opening 50 (see, in particular, FIG. 7).

Valve assembly 100, 200 is displaceable between a first position and a second position. The first position thereby corresponds to a completely closed position of valve closing element 120, 220 and the second position corresponds a completely open position of valve closing element 120, 220. Valve closing element 120, 220 is designed to seal both bypass opening 50 and also connection region 40 in the completely closed position. 'Sealing' is not understood as a hermetic seal with respect to connection region 40; rather, valve closing element 120, 220 penetrates into connection region 40 in such a way that an overflow between spirals 36, 38 is substantially suppressed. This means that a majority of the gas volume flow (exhaust gases) flowing through a respective spiral 36, 38, preferably more than 95% and particularly preferably more than 99% of the gas volume flow of exhaust gases flowing through a respective spiral is prevented from an overflow between spirals 36, 38 by valve closing element 120, 220.

'Completely open' is not understood to necessarily mean the theoretically achievable opening surface of connection region 40 and the theoretically achievable opening surface of bypass opening 50, wherein the theoretically achievable opening surface is to be considered that respective surface which is exposed by connection region 40 or bypass opening 50 when they are not (partially) blocked by valve closing element 120, 220. Thus, the completely open position is to be understood instead as a maximally achievable open position for the respective embodiment. This is fundamentally dependent on the kinematics of valve assembly 100, 200, for example, on the maximally achievable opening angle α of valve closing element 120, 220, and also on the geometric ratios of valve closing element 120, 220 and lever 110, 210. The above mentioned parameters for setting the valve characteristics, and also other parameters listed in the scope of this description, may, in particular, play a role here. Consequently, valve assembly 100, 200 may be designed in such a way that the 'completely open' position exposes the entire theoretically achievable opening surface. This is, for example, the case when valve closing element 120, 220 is completely pivoted out of connection region 40 and bypass opening 50. In correspondingly different embodiments of valve assembly 100, 200, for example in the case of a limitation of opening angle α, the theoretically achievable opening surface, minus the partial regions of the theoretically achievable opening surface blocked by valve closing element 120, 220, is exposed in the 'completely open' position. The actually present opening surface may also be designated as the resulting opening surface. The respective resulting opening surface of connection region 40 and of bypass opening 50 or a ratio of the two may be influenced, in particular, by a corresponding embodiment of valve closing element 120, 220. This also correspondingly applies for an intermediate position of valve closing element 120, 220 between the completely open position and the closed position. Depending on opening angle α, and optionally additionally influenced by another setting parameter like the configuration of outer contour 129, 229, the ratio of the resulting opening surface of connection region 40 and the resulting opening surface of bypass opening 50 may be greater than, equal to, or less than one.

A valve region 42 is designed in connection region 40. This functions for accommodating valve closing element 120, 220. Valve closing element 120, 220 in the completely closed position may interact with valve region 42 in such a way that an overflow of exhaust gases between first spiral 36 and second spiral 38 in connection region 40 is suppressed. As already mentioned, this does not mean that valve closing element 120, 220 hermetically seals valve region 42 at this point.

Turbine housing 30 has a valve seat 33 in connection region 40. Valve seat 33 is thereby designed in such a way that, in the closed position of valve closing element 120, 220, annular sealing surface 123, 223 may interact with valve seat 33 in order to seal bypass opening 50.

Valve assembly 100, 200 is designed in order to be brought into multiple intermediate positions between the first position and the second position. This means that valve assembly 100, 200 is steplessly adjustable. Expressed in other words, this means that valve assembly 100, 200 is continuously adjustable. By this means, valve assembly 100, 200 may be flexibly adapted to the most varied of operating states and demands.

Valve assembly 100, 200 and in particular valve closing element 120, 220 are designed in such a way that a displacement of valve assembly 100, 200 from the first position into the second position initially continuously opens only connection region 40 for the overflow of exhaust gases between first spiral 36 and second spiral 38, and, starting at a certain degree of opening of valve closing element 120, 220, additionally effects a continuous opening of bypass opening 50. By this means, the overflow between spirals 36, 38 may be controlled, decoupled from bypass opening 50 up to a certain degree (degree of opening). This leads to a more flexible valve assembly 100, 200 which is adjustable in a more targeted way to certain operating ranges.

FIG. 8a shows a sectional top view of turbine housing 30 with an inserted turbine wheel 20. Valve assembly 100, 200 is not thereby depicted. Turbine housing 30 comprises a first housing tongue 32a and a second housing tongue 32b. First and second spirals 36, 38 are thereby separated from each other by first and second housing tongues 32a, 32b in the inlet region to turbine wheel 20. First and second housing tongue 32a, 32b are thereby arranged offset around turbine wheel 20 by 180°. Alternatively, first and second housing tongues 32a, 32b may be arranged around turbine wheel 20 fundamentally in a range from 170°-190°, in particular offset by 175° or 185°. A first radial distance 34a is provided between turbine wheel 20 and first housing tongue 32a and a second radial distance 34b is provided between turbine wheel 20 and second housing tongue 32b. FIG. 8b shows a detail section regarding this corresponding to line A:A from FIG. 8a, in which radial distance 34b is clear. First radial distance 34a and second radial distance 34b have a value between 0.5 mm and 5 mm, preferably a value between 0.75 mm and 1.5 mm, and particular preferably a value of 1 mm. First radial distance 34a and second radial distance 34b may thereby also be expressed differently. On the one hand, it is ensured, due to radial distances 34a, 34b, that no contact occurs between rotating turbine wheel 20 and housing 30. Damages to turbine 10 and optionally even a failure of turbine 10 are thereby prevented. On the other hand, it is ensured by the narrow configuration of radial distances 34a, 34b that the exhaust gas pulses from first spiral 36 and second spiral 38 remain separated up to directly before the impingement on turbine wheel 20.

Although the present invention has been described and is defined in the attached claims, it should be understood that the invention may also be alternatively defined according to the following embodiments:

1. A valve assembly (100) for a multi-scroll turbine (10) for controlling an overflow of exhaust gases between a first spiral (36) and a second spiral (38) and for controlling a bypass opening (50), wherein the valve assembly (100) comprises:
   a lever (110) and
   a valve closing element (120) which is operatively connected to the lever (110),
   characterized by
   a spring element (130) which is designed to pre-bias the valve closing element (120) against the lever (110).
2. The valve assembly (100) according to Embodiment 1, characterized in that the valve closing element (120) comprises a cylindrical projection (122).
3. The valve assembly (100) according to Embodiment 2, characterized in that the valve closing element (120) is designed as at least partially hollow and wherein the cylindrical projection (122) extends centrally from the bottom (121) of hollow valve closing element (120) into a cavity (124) of the valve closing element (120).
4. The valve assembly (100) according to Embodiment 3, characterized in that the lever (110) has a valve section (112), which is designed to project into the cavity (124).
5. The valve assembly (100) according to Embodiment 4, characterized in that the valve section (112) has an a substantially fork-shaped or a substantially eyelet-shaped end region (114), wherein the end region (114) surrounds the cylindrical projection (122) of the valve closing element (120) so that the lever (110) is operatively connected to the valve closing element (120).
6. The valve assembly (100) according to any one of the preceding embodiments, characterized in that the valve closing element (120) has a sliding contact surface (126) on which a first sliding contact surface (116) of the lever (110) may slide.
7. The valve assembly (100) according to Embodiment 6, characterized in that the sliding contact surface (126) is arranged on an inner contour (128) of the valve closing element (120).
8. The valve assembly (100) according to any one of Embodiments 6 or 7, characterized in that the sliding contact surface (126) is curved, in particular is designed as curved and annular, and the first sliding contact surface (116) of the lever (110) is designed as curved or conical so that the lever (110) may slide via the first sliding contact surface (116) on the sliding contact surface (126) of the valve closing element (120).
9. A valve assembly (200) for a multi-scroll turbine (10) for controlling an overflow of exhaust gases between a first spiral (36) and a second spiral (38) and for controlling a bypass opening (50), wherein the valve assembly (200) comprises:
   a lever (210) and
   a valve closing element (220) which is operatively connected to the lever (210),
   characterized in that
   the valve closing element (220) is designed as at least partially hollow and comprises a cylindrical projection (222) which extends centrally from the bottom (221) of the hollow valve closing element (220) into a cavity (224) of the valve closing element (220), and the lever (210) has a valve section (212) with a substantially hollow cylindrical end region (214) which is arranged in the cavity (224) and surrounds the cylindrical projection (222) so that the lever (210) is operatively connected to the valve closing element (220).

10. The valve assembly (200) according to Embodiment 9, additionally comprising a spring element (230) which is designed to pre-bias the valve closing element (220) against the lever (210).
11. The valve assembly (200) according to any one of Embodiments 9 or 10, characterized in that the valve section (212) is designed to project into the cavity (224).
12. The valve assembly (200) according to any one of Embodiments 9 to 11, characterized in that the valve closing element (220) has a sliding contact surface (226) on which a first sliding contact surface (216) of the lever (210) may slide.
13. The valve assembly (200) according to Embodiment 12, characterized in that the sliding contact surface (226) is arranged on an inner contour (228) of the valve closing element (220).
14. The valve assembly (200) according to any one of Embodiments 12 or 13, characterized in that the sliding contact surface (226) is designed as curved or conical, wherein the sliding contact surface (226) is also designed in particular as annular, and the first sliding contact surface (216) of the lever (210) is designed as curved so that the lever (210) may slide via the first sliding contact surface (216) on the sliding contact surface (226) of the valve closing element (220).
15. The valve assembly (200) according to any one of Embodiments 9 to 14, characterized in that the lever (210) comprises a first annular projection (214a) and a second annular projection (214b), wherein the first annular projection (214a extends radially outward from the hollow cylindrical end region (214) and is spaced axially apart from the second annular projection (214b) along a hollow cylindrical axis (222a).
16. The valve assembly (200) according to Embodiment 15, characterized in that the second annular projection (214b) extends radially outwardly from the hollow cylindrical end region (214), or, alternatively, the second annular projection (214b) extends radially inwardly from the hollow cylindrical end region (214).
17. The valve assembly (200) according to Embodiment 15, characterized in that the second annular projection (214b) extends radially outward from the hollow cylindrical end region (214), wherein a radially outer lateral face of the second annular projection (214b) is designed in such a way, in particular is designed as curved, and contacts the inner contour (228) in such a way that a limited tilting of the lever (210) is facilitated with respect to the valve closing element (220).
18. The valve assembly (200) according to Embodiment 15, characterized in that the second annular projection (214b) extends radially inward from the hollow cylindrical end region (214), wherein a radially outer lateral face of the second annular projection (222) is designed in such a way, in particular is designed as curved, and contacts a radially inner lateral surface of the second annular projection (214b) in such a way that a limited tilting of the lever (210) is facilitated with respect to the valve closing element (220).
19. The valve assembly (200) according to any one of Embodiments 15 to 18, characterized in that the second annular projection (214b) is configured to engage with the inner contour (228) of the valve closing element (220) in such a way that the lever (210) is centered with respect to the valve closing element (220).
20. The valve assembly (200) according to any one of Embodiments 15 to 19, if dependent on any one of Embodiments 12 to 14, characterized in that the first sliding contact surface (216) is arranged on the first annular projection (214a), wherein the first annular projection (214a) is located in a contact region (206) between the valve closing element (220) and the lever (210) on the bottom (221) of the cavity (224).
21. The valve assembly (200) according to any one of Embodiments 9 to 20, characterized in that an outer diameter of the cylindrical projection (222) is smaller than an inner diameter of the hollow cylindrical end region (214).
22. The valve assembly (100; 200) according to any one of Embodiments 2 to 8 or according to any one of Embodiments 10 to 21, additionally comprising a disk (140; 240) which is arranged on the cylindrical projection (122; 222) of the valve closing element (120; 220).
23. The valve assembly (100; 200) according to Embodiment 22, characterized in that the disk (140; 240) is applied on a free end of the cylindrical projection (122; 222).
24. The valve assembly (100; 200) according to Embodiment 23, characterized in that the disk (140; 240) is fixed on the free end of the cylindrical projection (122; 222), in particular is welded to the cylindrical projection (122; 222).
25. The valve assembly (100; 200) according to any one of Embodiments 22 to 24, characterized in that the spring element (130; 230) is arranged between the disk (140; 240) and the lever (110; 210), wherein the lever (110; 210) is arranged in the region of the cylindrical projection (122; 222).
26. The valve assembly (100; 200) according to any one of Embodiments 22 to 25, characterized in that the spring element (130; 230) is arranged between the valve closing element (120; 220) and the lever (110; 210).
27. The valve assembly (100; 200) according to any one of the preceding embodiments, characterized in that a first contact region (106; 206) is designed between the valve closing element (120; 220) and the lever (110; 210), and is designed for mutual sliding.
28. The valve assembly (100; 200) according to any one of the preceding embodiments in which a spring element (130; 230) is provided, characterized in that a second contact region (108; 208) is designed between the spring element (130; 230) and the lever (110; 210) and is designed for mutual sliding.
29. The valve assembly (100; 200) according to any one of the preceding embodiments, if dependent on Embodiment 6 or Embodiment 12, characterized in that the first sliding contact surface (116; 216) of the lever (110; 210) and the sliding contact surface (126; 226) of the valve closing element (120; 220) contact one another via a linear contact.
30. The valve assembly (100; 200) according to any one of the preceding embodiments, characterized in that the lever (110; 210) has a second sliding contact surface (118; 218), in particular a curved or conical sliding contact surface (118; 218) on which a first sliding contact surface (136; 236) of the spring element (130; 230) may slide.
31. The valve assembly (100; 200) according to Embodiment 30, characterized in that the second sliding contact surface (118; 218) of the lever (110; 210) and the first sliding contact surface (136; 236) of the spring element (130; 230) contact one another via a linear contact.
32. The valve assembly (100; 200) according to any one of the preceding embodiments, characterized in that the spring element (130; 230) is designed as a disk spring.

33. The valve assembly (100; 200) according to any one of the preceding embodiments, characterized in that the spring element (130; 230) is designed as a substantially annular base body (232) with at least three spring arms (234) extending from an outer periphery of the annular base body (232).

34. The valve assembly (100; 200) according to Embodiment 33, characterized in that at least two of the at least three spring arms (234) are configured differently.

35. The valve assembly (100; 200) according to any one of the preceding embodiments, characterized in that the valve closing element (120; 220) is designed as substantially hat-shaped.

36. The valve assembly (100; 200) according to any one of Embodiments 4 to 35, characterized in that the valve section (112; 212) is designed as stepped-shaped to project into the cavity (124; 224).

37. The valve assembly (100; 200) according to any one of Embodiments 4 to 36, characterized in that the valve section (112; 212) and/or the spring element (130; 230) are arranged in the cavity (124; 224) of the valve closing element (120; 220).

38. The valve assembly (100; 200) according to any one of the preceding embodiments, additionally comprising a spindle (150; 250) which is connected to the lever (110; 210) for displacing the valve closing element (120; 220), preferably wherein the lever (110; 210) and spindle (150; 250) are integrally formed, or particularly preferably wherein the lever (110; 210) and the spindle (150; 250) are welded to each other.

39. The valve assembly (100; 200) according to any one of the preceding embodiments, characterized in that the valve closing element (120; 220) has an inner contour (128; 228) and an outer contour (129; 229).

40. The valve assembly (100; 200) according to Embodiment 39, characterized in that the outer contour (129; 229) is configured as substantially bowl-shaped.

41. The valve assembly (100; 200) according to any one of Embodiments 39 or 40, characterized in that the outer contour (129; 229) is configured to be substantially rotationally symmetrical or oval, in particular ellipse shaped, wherein a primary axis (121a; 221a) of the ellipse is arranged along a valve region (42), which extends between the first spiral (36) and the second spiral (38).

42. The valve assembly (100; 200) according to any one of Embodiments 39 to 41, characterized in that the outer contour (129; 229) comprises a first contour section (129a; 229a) and a second contour section (129b; 229b).

43. The valve assembly (100; 200) according to Embodiment 42, characterized in that the first contour section (129a; 229a) may be defined substantially by three surfaces (125, 125a, 125b, 125c; 225, 225a, 225b, 225c), wherein at least two of the three surfaces (125, 125a, 125b, 125c; 225, 225a, 225b, 225c) correspond to radii (325a, 325b, 325c) of different curvatures.

44. The valve assembly (100; 200) according to Embodiment 43, characterized in that the surfaces (125, 125a, 125b, 125c; 225, 225a, 225b, 225c) of the first contour section (129a; 229a) are configured in such a way that, in the installed state, the contour section (129a; 229a) can be engaged with a complementary-shaped valve region (42) in a connection region (40) between the first spiral (36) and the second spiral (38).

45. The valve assembly (100; 200) according to Embodiment 44, characterized in that that the surfaces (125, 125a, 125b, 125c; 225, 225a, 225b, 225c) of the first contour section (129a; 229a) are configured in such a way that, during a displacement of the valve closing element (120; 220) from a closed position into an open position, the first contour section (129a; 229a) initially continuously opens only the connection region (40) for the overflow of exhaust gases between the first spiral (36) and the second spiral (38), and, starting at a specific degree of opening of the valve closing element (120; 220), additionally effects a continuous opening of the bypass opening (50).

46. The valve assembly (100; 200) according to any one of Embodiments 39 to 45, characterized in that the outer contour (129; 229) has recesses (127; 227) in order to increase a bypass flow.

47. The valve assembly (100; 200) according to Embodiment 46, if dependent on any one of Embodiments 42 to 45, characterized in that the recesses (127; 227) are arranged in the first contour section (129a; 229a).

48. The valve assembly (100; 200) according to Embodiment 47, characterized in that the recesses (127; 227) are arranged on lateral sides of the first contour section (129a; 229a) and opposite each other by 180°.

49. The valve assembly (100; 200) according to any one of Embodiments 47 or 48, characterized in that the recesses (227) are designed in such a way that, during a displacement of the valve closing element (120; 220) from a closed position into an open position, the first contour section (129a; 229a) virtually simultaneously continuously opens the bypass opening (50) and the connection region (40) for the overflow of exhaust gases between the first spiral (36) and the second spiral (38).

50. The valve assembly (100; 200) according to any one of Embodiments 47 to 49, characterized in that the recesses (227) are configured in such a way that they form a web-shaped elevation (129c; 229c) in the outer contour (129; 229) in the first contour section (129a; 229a), which can be engaged with a complementary-shaped valve region (42) in a connection region (40) between the first spiral (36) and the second spiral (38).

51. The valve assembly (100; 200) according to any one of the preceding embodiments, if dependent on Embodiment 42, characterized in that the second contour section (129b; 229b) forms an annular sealing surface (123; 223) which is designed in such a way that, in the installed state, it can be brought into contact with a valve seat (33) of a turbine housing (30) in order to seal a bypass opening (50) in a connection region (40) between the first spiral (36) and the second spiral (38).

52. The valve assembly (100; 200) according to any one of the preceding embodiments, characterized in that the valve closing element (120; 220) forms an annular sealing surface (123; 223) which is designed in such a way that, in the installed state, it can be brought into contact with a valve seat (33) of a turbine housing (30) in order to seal a bypass opening (50) in a connection region (40) between the first spiral (36) and the second spiral (38).

53. The valve assembly (100; 200) according to any one of the preceding embodiments, characterized in that the valve closing element (120; 220) is designed in such a way that, in the installed state, in can be brought into engagement with a valve region (42) in a connection region (40) between the first spiral (36) and the second spiral (38).

54. The valve assembly (100; 200) according to Embodiment 53, characterized in that a seal (160; 260) is formed between the valve closing element (120; 220) and the connection region (40).

55. The valve assembly (100; 200) according to Embodiment 54, characterized in that the seal (160; 260) comprises a sealing element (162; 262).

56. The valve assembly (100; 200) according to Embodiment 55, characterized in that the sealing element (162; 262) is arranged on the valve closing element (120; 220) or an the valve region (42).

57. The valve assembly (100; 200) according to Embodiment 54, characterized in that the seal (160; 260) comprises a labyrinth-like seal (164; 264), wherein the valve region (42) and the valve closing element (120; 220) engage into one another in the closing direction in such a way that, at least in the closed state of valve closing element (120; 220), an overlap by the valve region (42) and the valve closing element (120; 220) is present in the direction from the first spiral (36) to the second spiral (38).

58. The valve assembly (100; 200) according to Embodiment 57, characterized in that the labyrinth-like seal (164; 264) comprises an elevation (164*a*; 264*a*) following the course of the valve region (42) and a depression (164*b*; 264*b*) following the course of the valve region (42), which engage into each other, at least in the closed state of the valve closing element (120; 220), wherein the elevation (164*a*; 264*a*) is designed on one of the valve region (42) or the valve closing element (120; 220), and wherein the depression (164*b*; 264*b*) is designed on the other of the valve region (42) or the valve closing element (120; 220).

59. A multi-scroll turbine (10) for an exhaust gas turbocharger comprising:
a turbine wheel (20),
a turbine housing (30) with a first spiral (36) and a second spiral (38),
a connection region (40) in which the first spiral (36) and the second spiral (38) are fluidically connected to one another, and
a bypass opening (50) which is arranged in the connection region (40),
characterized by
a valve assembly (100; 200) according to any one of the preceding embodiments, which is arranged at least partially in the connection region (40) so that the valve closing element (120; 220) can interact with the connection region (40) and the bypass opening (50).

60. The multi-scroll turbine (10) according to Embodiment 59, wherein the valve assembly (100; 200) is displaceable between a first position and a second position, wherein the first position corresponds to a completely closed position of valve closing element (120; 220) and the second position corresponds to a completely open position of the valve closing element (120; 220).

61. The multi-scroll turbine (10) according to Embodiment 60, wherein the valve closing element (120; 220) is designed to seal both the bypass opening (50) and also the connection region (40) in the completely closed position.

62. The multi-scroll turbine (10) according to any one of Embodiments 60 or 61, wherein a valve region (42) for accommodating the valve closing element (120; 220) is designed in connection region (40), wherein the valve closing element (120; 220) interacts with the valve region (42) in the completely closed position in order to suppress an overflow of exhaust gases between the first spiral (36) and the second spiral (38) in the connection region (40).

63. The multi-scroll turbine (10) according to any one of Embodiments 60 to 62, wherein the turbine housing (30) has a valve seat (33) in the connection region (40), and wherein an annular sealing surface (123; 223) of the valve closing element (120; 220) interacts with the valve seat (33) in the closed position of the valve closing element (120; 220) to seal the bypass opening (50).

64. The multi-scroll turbine (10) according to any one of Embodiments 60 to 63, wherein the valve assembly (100; 200) can be brought into multiple intermediate positions between the first position and the second position.

65. The multi-scroll turbine (10) according to any one of Embodiments 60 to 64, wherein the valve assembly (100; 200) and in particular the valve closing element (120; 220) are designed in such a way that a displacement of the valve assembly (100; 200) from the first position into the second position initially continuously opens only the connection region (40) for the overflow of exhaust gases between the first spiral (36) and the second spiral (38), and starting at a certain degree of opening of the valve closing element (120; 220), additionally effects a continuous opening of the bypass opening (50).

66. The multi-scroll turbine (10) according to any one of the preceding embodiments, wherein the first and the second spirals (36, 38) are separated by a first and a second housing tongue (32*a*, 32*b*) of the turbine housing (30) in the inlet region of the turbine wheel (20).

67. The multi-scroll turbine (10) according to Embodiment 66, wherein a first radial distance (34*a*) is provided between the turbine wheel (20) and the first housing tongue (32*a*), and wherein a second radial spacing (34*b*) is provided between the turbine wheel (20) and the second housing tongue (32*b*).

68. The multi-scroll turbine (10) according to Embodiment 67, wherein the first radial distance (34*a*) and/or the second radial distance (34*b*) have a value between 0.5 mm and 5 mm, preferably a value between 0.75 mm and 1.5 mm, and particular preferably a value of 1 mm.

The invention claimed is:

1. A valve assembly (200) for a multi-scroll turbine (10) for controlling an overflow of exhaust gases between a first spiral (36) and a second spiral (38) and for controlling a bypass opening (50), wherein the valve assembly (200) comprises:
a lever (210) and
a valve closing element (220) which is operatively connected to the lever (210),
characterized in that
the valve closing element (220) is designed as at least partially hollow and comprises a cylindrical projection (222) which extends centrally from the bottom (221) of the hollow valve closing element (220) into a cavity (224) of the valve closing element (220), and the lever (210) has a valve section (212) with a substantially hollow cylindrical end region (214) which is arranged in the cavity (224) and surrounds the cylindrical projection (222) so that the lever (210) is operatively connected to the valve closing element (220),
wherein the valve closing element (220) has an inner contour (228) and an outer contour (229), the outer counter (229) comprising a first contour section (229*a*) and a second contour section (229*b*), the first contour section (229*a*) being defined by first, second and third surfaces (225*a*, 225*b*, 225*c*) which define first, second and third radii (325*a*, 325*b*, 325*c*) of different curvatures, respectively, and
wherein the cylindrical projection (222) extends above the valve closing element (220), characterized in that the valve closing element (220) has a closing element sliding contact surface (226) on which a first sliding contact surface (216) of the lever (210) may slide, wherein the first sliding contact surface (216) is curved and defines a first radius of curvature, and wherein the closing element sliding contact surface (226) is one of a conical sliding contact surface and a curved sliding contact surface such that when the closing element sliding contact surface (226) is a curved sliding contact surface, the radius of curvature of the closing element sliding contact surface (226) is greater than the first radius of curvature.

2. The valve assembly (200) according to claim 1, characterized in that the sliding contact surface (226) is arranged on an inner contour (228) of the valve closing element (220).

3. The valve assembly (100; 200) according to claim 1, characterized in that the valve closing element (120; 220) has an inner contour (128; 228) and an outer contour (129; 229), wherein the outer contour (129; 229) is configured to be substantially rotationally symmetrical or oval, in particular ellipse shaped, wherein a primary axis (121*a*; 221*a*) of the ellipse is arranged along a valve region (42), which extends between the first spiral (36) and the second spiral (38).

4. The valve assembly (200) according to claim 1, characterized in that the first radii is from 30 to 60 mm, the second radii is from 2 to 6 mm, and the third radii is from 30 to 60 mm.

5. The valve assembly (200) according to claim 1, additionally comprising a spring element (230) which is designed to pre-bias the valve closing element (220) against the lever (210).

6. The valve assembly (100; 200) according to claim 5, characterized in that the lever (110; 210) has a second sliding contact surface (118; 218) being a curved or conical sliding contact surface (118; 218) on which a first sliding contact surface (136; 236) of the spring element (130; 230) may slide.

7. The valve assembly (200) according to claim 5, characterized in that the lever (210) comprises a first annular projection (214*a*) and a second annular projection (214*b*), wherein the first annular projection (214*a*) extends radially outward from the hollow cylindrical end region (214) and is spaced axially apart from the second annular projection (214*b*) along a hollow cylindrical axis (222*a*).

8. The valve assembly (200) according to claim 1, characterized in that the lever (210) comprises a first annular projection (214*a*) and a second annular projection (214*b*), wherein the first annular projection (214*a*) extends radially outward from the hollow cylindrical end region (214) and is spaced axially apart from the second annular projection (214*b*) along a hollow cylindrical axis (222*a*).

9. The valve assembly (200) according to claim 8, characterized in that the first sliding contact surface (216) is arranged on the first annular projection (214*a*), wherein the first annular projection (214*a*) is located in a contact region (206) between the valve closing element (220) and the lever (210) on the bottom (221) of the cavity (224).

10. The valve assembly (100; 200) according to claim 1, characterized in that the valve closing element (120; 220) is designed in such a way that, in the installed state, it can be brought into engagement with a valve region (42) in a connection region (40) between the first spiral (36) and the second spiral (38), wherein a seal (160; 260) is designed between the valve closing element (120; 220) and the connection region (40).

11. The valve assembly (100) according to claim 10, wherein the valve region (42) and the valve closing element (120; 220) engage into each other in the closing direction in such a way that, at least in the closed state of the valve closing element (120; 220), an overlap by the valve region (42) and the valve closing element (120; 220) is present in the direction from the first spiral (36) to the second spiral (38).

12. A valve assembly (100) for a multi-scroll turbine (10) for controlling an overflow of exhaust gases between a first spiral (36) and a second spiral (38) and for controlling a bypass opening (50), wherein the valve assembly (100) comprises:
a lever (110) and
a valve closing element (120) which is operatively connected to the lever (110),
characterized by
a spring element (130) which is designed to pre-bias the valve closing element (120) against the lever (110),
wherein the valve closing element (120) has an inner contour (128) and an outer contour (129), the outer counter (129) comprising a first contour section (129*a*) and a second contour section (129*b*), the first contour section (129*a*) being defined by first, second and third surfaces (125*a*, 125*b*, 125*c*) which define first, second and third radii (325*a*, 325*b*, 325*c*) of different curvatures, respectively, and
wherein a cylindrical projection (222) extends above the valve closing element (120) characterized in that the valve closing element (220) has a closing element sliding contact surface (226) on which a first sliding contact surface (216) of the lever (210) may slide, wherein the first sliding contact surface (216) is curved and defines a first radius of curvature, and wherein the closing element sliding contact surface (226) is one of a conical sliding contact surface and a curved sliding contact surface such that when the closing element sliding contact surface (226) is a curved sliding contact surface, the radius of curvature of the closing element sliding contact surface (226) is greater than the first radius of curvature.

13. The valve assembly (100) according to claim 12, characterized in that the sliding contact surface (126) is arranged on an inner contour (128) of the valve closing element (120).

14. The valve assembly (100) according to claim 12, characterized in that the valve closing element (120) comprises a cylindrical projection (122), wherein the valve closing element (120) is designed as at least partially hollow, and wherein the cylindrical projection (122) extends centrally from the bottom (121) of the hollow valve closing element (120) into a cavity (124) of the valve closing element (120).

15. The valve assembly (100; 200) according to claim 14, additionally comprising a disk (140; 240) which is arranged on the cylindrical projection (122; 222) of the valve closing element (120; 220).

16. A multi-scroll turbine (10) for an exhaust gas turbocharger comprising:
a turbine wheel (20),
a turbine housing (30) with a first spiral (36) and a second spiral (38),
a connection region (40) in which the first spiral (36) and the second spiral (38) are fluidically connected to one another, and
a bypass opening (50) which is arranged in the connection region (40),
characterized by
a valve assembly (100; 200) for controlling an overflow of exhaust gases between the first spiral (36) and the second spiral (38) and for controlling the bypass opening (50), wherein the valve assembly (200) comprises: a lever (210) and a valve closing element (220) which is operatively connected to the lever (210), characterized in that the valve closing element (220) is designed as at least partially hollow and comprises a cylindrical projection (222) which extends centrally from the bottom (221) of the hollow valve closing element (220) into a cavity (224) of the valve closing element (220), and the lever (210) has a valve section (212) with a substantially hollow cylindrical end region (214) which is arranged in the cavity (224) and surrounds the cylindrical projection (222) so that the lever (210) is operatively connected to the valve closing element (220), which is arranged at least partially in the connection region (40) so that the valve closing element (120; 220) can interact with the connection region (40) and the bypass opening (50), wherein the valve closing element (220) has an inner contour (228) and an outer contour (229), the outer counter (229) comprising a first contour section (229*a*) and a second contour section (229*b*), the first contour section (229*a*) being defined by first, second and third surfaces (225*a*, 225*b*, 225*c*) which define first, second and third radii (325*a*, 325*b*, 325*c*) of different curvatures, respectively, and wherein the cylindrical projection (222) extends above the valve closing element (220) characterized in that the valve closing element (220) has a closing element sliding contact surface (226) on which a first sliding contact surface (216) of the lever (210) may slide, wherein the first sliding contact surface (216) is curved and defines a first radius of curvature, and wherein the closing element sliding contact surface (226) is one of a conical sliding contact surface and a curved sliding contact surface such that when the closing element sliding contact surface (226) is a curved sliding contact surface, the radius of curvature of the closing element sliding contact surface (226) is greater than the first radius of curvature.

* * * * *